(12) United States Patent
Boon

(10) Patent No.: US 6,233,279 B1
(45) Date of Patent: May 15, 2001

(54) IMAGE PROCESSING METHOD, IMAGE PROCESSING APPARATUS, AND DATA STORAGE MEDIA

(75) Inventor: Choong Seng Boon, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/321,552

(22) Filed: May 28, 1999

(30) Foreign Application Priority Data

May 28, 1998 (JP) ................................................. 10-147835

(51) Int. Cl.[7] ...................................................... H04N 7/12
(52) U.S. Cl. ...................................... 375/240.08; 382/243
(58) Field of Search .................................. 348/416, 425.1, 348/425.2, 399.1; 375/240, 240.08, 240.06, 240.27; 382/243

(56) References Cited

U.S. PATENT DOCUMENTS 5,748,240 * 5/1998 Carr et al. ............................ 348/384
6,005,980 * 12/1999 Eifrig et al. ......................... 382/236

FOREIGN PATENT DOCUMENTS

97/28650    8/1997   (WO) .

* cited by examiner

Primary Examiner—Vu Le
(74) Attorney, Agent, or Firm—Wenderoth, Lind & Ponack, L.L.P.

(57) ABSTRACT

An image coding apparatus comprises a subtraction unit operable to output difference data between image data of a target block in a present frame and image data of a prediction block for the target block, as image data of a difference block; a data compressor operable to compress the image data of the difference block to output image data of a compressed difference block; a data decompressor operable to decompress the image data of the compressed difference block to restore the difference data as image data of a decompressed difference block; an adder operable to add the image data of the decompressed difference block and the image data of the prediction block to generate image data of a reproduced block; a padding unit operable to output the image data of the reproduced block after replacing insignificant pixel values constituting the reproduced block with a predetermined padding value when the reproduced block is an ineffective block comprising only insignificant pixels, and output the image data of the reproduced block as it is when the reproduced block is an effective block including at least one significant pixel; a frame memory operable to store as reference image data, the image data of the effective block and the padded reproduced block; and a prediction data generation unit operable to generate image data of a prediction block for a target block in a frame to be processed next, from the reference image data stored in the frame memory.

18 Claims, 10 Drawing Sheets

IMAGE PROCESSING METHOD, IMAGE PROCESSING APPARATUS, AND DATA STORAGE MEDIA

FIELD OF THE INVENTION

The present invention relates to image processing methods, image processing apparatuses, and data storage media and, more particularly, to a padding process performed on reproduced image data used for generating prediction image data, when predictive coding and predictive decoding for an image signal corresponding to an object having an arbitrary shape are performed for each of plural blocks into which a region including the object is divided.

BACKGROUND OF THE INVENTION

In order to store or transmit digital image data with high efficiency, it is necessary to compressively encode the digital image data. Under the existing circumstances, as a method for compressive coding digital image data, there is DCT (Discrete Cosine Transform) represented by JPEG (Joint Photographic Experts Group) or MPEG (Moving Picture Experts Group). Additionally, there are waveform coding methods such as sub-band coding, wavelet coding, and fractal coding.

Further, in order to eliminate redundant image data between images such as adjacent frames, inter-frame prediction using motion compensation is carried out. That is, pixel values of pixels composing the present frame are represented using difference values between these pixel values of the present frame and the pixel values of pixels composing the previous frame, and a difference image signal comprising the difference values is subjected to waveform coding.

In recent years, not only to improve the compression efficiency of an image signal but also to realize reproduction of the image signal in units of objects which compose an image of one frame, there has been proposed a coding method in which the image signals corresponding to the respective objects are compressively coded object by object for transmission. At the reproduction end, the coded image signal obtained by the above-mentioned coding method is subjected to a decoding process adapted to the coding method. That is, in the decoding process, the coded image signals corresponding to the respective objects are decoded, and the reproduced image signals of the respective objects obtained by the decoding process are composited to generate a reproduced composite image signal. Then, based on the reproduced composite image signal, an image corresponding to one frame and comprising the respective objects is displayed.

To use the above-mentioned coding method for coding an image signal object by object enables the user to arbitrarily combine the objects to generate a composite image at the reproduction end, whereby the user can edit a moving picture easily. Furthermore, it is possible to display a moving picture comprising only objects of relatively high importance without reproducing objects of relatively low importance, according to the congestion of the transmission line, the performance of the reproduction apparatus, and the preference of the viewer.

When coding an image signal corresponding to an object (i.e., an image having an arbitrary shape), waveform transformation performing signal processing adapted to the shape of the object (e.g., shape-adaptive DCT) is used, or waveform transformation is carried out after performing a padding process on the image signal.

In the coding method using the padding process, to be specific, an image signal forming an image space corresponding to each object (object region) is subjected to padding for replacing the pixel values of pixels in an ineffective region of the object region with padding values obtained by a predetermined method, and the image signal after the padding is subjected to the conventional 8×8 cosine transformation. The ineffective region described above is a region of the object region, outside the object, and this region comprises pixels having no pixel values for displaying the object. That is, an image signal corresponding to the ineffective region comprises only insignificant sample values. Further, the 8×8 cosine transformation is a waveform transformation process in which an image signal corresponding to the object region is subjected to cosine transformation in units of image spaces each comprising 8×8 pixels.

Furthermore, as a specific method for eliminating a redundant signal between images such as adjacent frames, there is proposed a method in which difference data between an image signal to be coded (image data corresponding to a target block) and the corresponding prediction signal (image data of a prediction block corresponding to the target block) is obtained as a prediction error signal (image data of a difference block) by using an image space comprising 16×16 pixels as a unit region. The prediction signal is an image signal corresponding to a prediction region (prediction block) obtained by motion compensation. The motion compensation is a process to detect a region comprising 16×16 pixels as a prediction region (prediction block), the region giving image data whose difference from the image data of the target block is minimized, in a frame on which coding or decoding has already been performed.

However, there is a case where the prediction region (prediction block) includes pixels having insignificant sample values (insignificant pixels). In this case, when a difference between the image data of the prediction block including insignificant pixels and the image data of the target block to be coded is obtained, this difference often becomes very large because the sample values of the insignificant pixels are not always the optimum prediction values in view of reduction of the difference.

In order to solve this problem, there is proposed a method comprising the steps of: subjecting the image data of the prediction block to a padding process for replacing the insignificant sample values with predetermined padding values; obtaining difference data between the image data of the prediction block after the padding process and the image data of the target block, as image data of a difference block (prediction error signal); and subjecting the image data of the difference block to transformation for coding. In this way, by performing the padding process on the image data of the prediction block, the image data of the difference block can be suppressed.

Further, as an alternative method of coding and decoding, there is a scalability process in which data for image display is divided into a plurality of layers in a hierarchy according to the resolution of the image, followed by coding and decoding.

By using the scalability process (hierarchical coding and hierarchical decoding), a coded image signal (coded data) transmitted as a bit stream includes coded data corresponding to a low resolution image and coded data corresponding to a high resolution image. Therefore, the low resolution image (object) can be reproduced by reading a part of the transmitted coded data and decoding the data, while the high resolution image (object) can be reproduced by reading all of the transmitted coded data and decoding the data.

To be specific, the hierarchical coding process comprises the steps of: generating prediction data (data of a prediction block) corresponding to data of the high resolution image (data of a target block) by using data of the low resolution image; subtracting the prediction data based on the low resolution image data from the high resolution image data to generate difference data (data of a difference block); and coding only the difference data.

When the hierarchical coding is carried out object by object, i.e., when image data corresponding to an image (object) having an arbitrary shape is divided into a plurality of layers in a hierarchy according to the resolution of the object to be coded, it is necessary to perform hierarchical coding on a signal including shape information which indicates the arbitrary shape of the object as well as hierarchical coding on a texture signal (luminance signal and chrominance signal) for hierarchical color display of the object. In other words, when performing object-by-object scalability coding, not only the texture signal of the object but also the signal including the shape information (shape signal or transparency signal) must be separated to a high resolution signal and a low resolution signal was coded. The shape signal is a binary signal having, as its values, a pixel value "0" indicating that the pixel is positioned outside the object and a pixel value "1" indicating that the pixel is positioned inside the object. Further, the transparency signal is a multi-valued signal having "0" as a pixel value corresponding to pixels positioned outside the object, and values other than "0" (non-zero) as pixel values corresponding to pixels positioned inside the object. With respect to the pixels inside the object, the transparencies of the respective pixels constituting the object are shown by the pixel values other than "0".

Further, also in the prediction coding in the above-described scalability process, a prediction block including sample values which are not significant (insignificant sample values) is subjected to the padding process for replacing the insignificant sample values with padding values which minimize the difference values (values of difference data) and, thereafter, differences of sample values between the target block and the prediction block are obtained. Then, a prediction error signal for the target block (image data of the difference block) is generated, and the prediction error signal is coded. In this way, the prediction error signal can be suppressed by performing padding on the prediction block.

By the way, in the conventional prediction coding, padding is also performed on reference image data corresponding to a reference image (reference frame) which has been processed previously to the image which is presently processed (present frame). In this padding process, amongst the blocks constituting the reference frame, boundary blocks including the boundary of the object are also padded.

Since such boundary block includes pixels having significant sample values and pixels having insignificant sample values, when the boundary block is padded, insignificant sample values are replaced with significant sample values by using significant sample values positioned at the boundary of the object so that no insignificant pixels are included in the boundary block.

In this padding process, when there are two padding values for a specific sample point (a specific pixel), i.e., a padding value which has been repeatedly used for padding of pixels in the horizontal pixel line including the specific pixel and a padding value which has been repeatedly used for padding of pixels in the vertical pixel line including the specific pixel, the average of the two padding values is used as a padding value for the specific pixel.

As described above, when image data of the prediction block are generated after padding the boundary blocks in the reference frame, the prediction error can be minimized even if the boundary slightly gets out of position.

Hence, also in the object-by-object scalability coding, in order to efficiently predict a high resolution image from a low resolution image, it is necessary to pad boundary blocks in a low resolution frame serving as a reference frame.

In brief, especially in the scalability coding, since the shape signal is divided into a plurality of layers in a hierarchy based on the resolution, the boundary between the inside and outside of the object is not identical between the low resolution shape image and the high resolution shape image. To be specific, it might occur that a target block to be coded is positioned inside the object in the high resolution frame while the target block is positioned outside the object in the corresponding low resolution frame. Such difference in object's boundaries between the high resolution frame and the low resolution frame is caused due to the fact that the transformation process to generate the low resolution shape signal from the high resolution shape signal is attended with a signal change which causes deformation of the shape, or that the information indicating the shape of the object changes due to compression of the shape signal. So, at the coding end, in order to increase the efficiency of prediction using the boundary blocks on the low resolution reference frame, these boundary blocks are subjected to padding.

However, if padding is performed on the boundary blocks included in the reference frame at the coding end as described above, padding must be performed on the boundary blocks included in the reference frame at the reproduction end as well. As the result, the number of padding processes increases at the reproduction end. Especially, there occurs a problem that many processes to detect the boundary of the arbitrary shape are needed. The time required for the padding process in reproduction increases in proportion to the number of the boundary blocks. Further, also in the object-by-object scalability coding, there occurs a problem that the time required for decoding increases due to the padding process for the boundary blocks on the low resolution reference frame at the reproduction end.

SUMMARY OF THE INVENTION

The present invention is made to solve the above-described problems and it is an object of the present invention to provide an image processing method and an image processing apparatus which can reduce the padding process for a reference image having an arbitrary shape at the reproduction end without degrading the coding efficiency and the quality of the reproduced image and, more particularly, which can avoid the situation that the number of processes increases in proportion to the number of boundary blocks.

It is another object of the present invention to provide a data storage medium which contains a program for making a computer perform image processing by the above-described image processing method.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an image processing method for coding an image signal corresponding to each frame forming an image space including an object of an arbitrary shape, for each of plural blocks into which the image space is divided. This method comprises: outputting difference data between image data of a target block to be coded in a frame which is presently processed and image data of a prediction block for the target block, as image data of a difference block; compressing the image data of the difference block to generate image data of a compressed difference block and then coding the image data of the compressed difference block to generated a coded image signal, while decompressing the image data of the compressed difference block to restore the difference data as image data of a decompressed difference block; adding the image data of the decompressed difference block and the image data of the prediction block to generate image data of a reproduced block; outputting the image data of the reproduced block after replacing insignificant pixel values constituting the reproduced block with a predetermined padding value when the reproduced block is an ineffective block comprising only insignificant pixels, on the other hand, outputting the image data of the reproduced block as it is when the reproduced block is an effective block including at least one significant pixel; and generating image data of a prediction block for a target block in a frame to be processed next in accordance with the image data of the effective block and the image data of the padded ineffective block. Therefore, the complexity of a padding process in a decoding process for reproduction at the receiving end can be significantly reduced, without degrading the coding efficiency and the image quality.

According to a second aspect of the present invention, there is provided an image processing method for decoding a coded image signal which is obtained by coding an image signal corresponding to each frame forming an image space including an object of an arbitrary shape, the coding and decoding being performed for each of plural blocks into which the image space is divided. This method comprises: performing data analysis on the coded image signal to extract, as image data of a compressed difference block, compressed data obtained by compressing difference data between image data of a target block to be coded and image data of a prediction block for the target block; decompressing the image data of the compressed difference block to restore the difference data as image data of a decompressed difference block in a frame which is presently processed; adding the image data of the decompressed difference block and image data of a prediction block for the decompressed difference block to generate image data of a reproduced block; outputting the image data of the reproduced block after replacing insignificant pixel values constituting the reproduced block with a predetermined padding value when the reproduced block is an ineffective block comprising only insignificant pixels, on the other hand, outputting the image data of the reproduced block as it is when the reproduced block is an effective block including at least one significant pixel; and generating image data of a prediction block for a decompressed difference block in a frame to be processed next, in accordance with the image data of the effective block and the image data of the padded ineffective block. Therefore, the complexity of the padding process in the decoding process can be significantly reduced without degrading the coding efficiency and the image quality.

According to a third aspect of the present invention, there is provided an image processing method for coding an image signal corresponding to each frame forming an image space including an object of an arbitrary shape, for each of plural blocks into which the image space is divided. This method comprises: outputting difference data between image data of a target block to be coded in a frame which is presently processed and image data of a prediction block for the target block, as image data of a difference block; compressing the image data of the difference block to generate image data of a compressed difference block and then coding the image data of the compressed difference block to generated a coded image signal, while decompressing the image data of the compressed difference block to restore the difference data as image data of a decompressed difference block; adding the image data of the decompressed difference block and the image data of the prediction block to generate image data of a reproduced block; overwriting only image data of effective blocks each including at least one significant pixel, amongst plural reproduced blocks, into a frame memory which is initialized at a predetermined timing, thereby storing the image data of the effective blocks as reference image data; and generating image data of a prediction block for a target block in a frame to be processed next in accordance with the reference image data stored in the frame memory. Therefore, at the receiving end, it is not necessary to perform padding for not only the boundary blocks but also the ineffective blocks amongst the reproduced blocks, whereby a padding process can be dispensed with in a decoding process for reproduction, without degrading the coding efficiency and the image quality.

According to a fourth aspect of the present invention, there is provided an image processing method for decoding a coded image signal which is obtained by coding an image signal corresponding to each frame forming an image space including an object of an arbitrary shape, the coding and decoding being performed for each of plural blocks into which the image space is divided. This method comprises: performing data analysis on the coded image signal to generate, as image data of a compressed difference block, compressed data obtained by compressing image data of a difference block which is difference data between image data of a target block to be coded and image data of a prediction block for the target block; decompressing the image data of the compressed difference block to restore the difference data as image data of a decompressed difference block in a frame which is presently processed; adding the image data of the decompressed difference block and image data of a prediction block for the decompressed difference block to generate image data of a reproduced block; overwriting only image data of effective blocks each including at least one significant pixel, amongst plural reproduced blocks, into a frame memory which is initialized at a predetermined timing, thereby storing the image data of the effective blocks as reference image data; and generating image data of a prediction block for a decompressed difference block in a frame to be processed next in accordance with the reference image data stored in the frame memory. Therefore, it is not necessary to perform padding for not only the boundary blocks but also the ineffective blocks amongst the reproduced blocks, whereby a padding process can be dispensed with in the decoding process for reproduction, without degrading the coding efficiency and the image quality.

According to a fifth aspect of the present invention, there is provided an image processing method for performing hierarchical coding on an image signal corresponding to each frame forming and image space including an object of an arbitrary shape, for each of plural blocks into which the image space is divided. This method comprises preprocessing for generating, as image data of target blocks to be subjected to the hierarchical coding, image data of a first target block having a first resolution and image data of a second target block having a second resolution different from the first resolution; and a first coding process for the image data of the first target block and a second coding process for the image data of the second target block. The first coding process comprises: outputting first difference data between the image data of the first target block in a frame which is presently processed and image data of a first prediction block for the first target block, as image data of a first difference block; compressing the image data of the first difference block to generate image data of a first compressed difference block and then coding the image data of the first compressed difference block to generate a first coded image signal, while decompressing the image data of the first compressed difference block to restore the first difference data as image data of the first decompressed difference block; adding the image data of a first decompressed difference block and the image data of the first prediction block to generate image data of a first reproduced block; outputting the image data of the first reproduced block after replacing insignificant pixel values constituting the first reproduced block with a predetermined padding value when the first reproduced block is an ineffective block comprising only insignificant pixels, on the other hand, outputting the image data of the first reproduced block as it is when the first reproduced block is an effective block including at least one significant pixel; and generating image data of a first prediction block for a first target block in a frame to be processed next in accordance with the image data of the effective block and the image data of the padded ineffective block, and generating resolution-converted data of the first reproduced block by performing resolution conversion to convert the first resolution to the second resolution. The second coding process comprises: performing weighted averaging on the resolution-converted data and image data of a second prediction block for the second target block in the frame which is presently processed, to generate weighted average prediction data; outputting second difference data between the image data of the second target block in the frame which is presently processed and the weighted average prediction data, as image data of the second difference block; compressing the image data of the second difference block to generate image data of a second compressed difference block and then coding the image data of the second compressed difference block to generate a second coded image signal, while decompressing the image data of the second compressed difference block to restore the second difference data as image data of a second decompressed difference block; adding the image data of the second decompressed difference block and the image data of the second prediction block to generate image data of a second reproduced block; outputting the image data of the second reproduced block after replacing insignificant pixel values constituting the second reproduced block with a predetermined padding value when the second reproduced block is an ineffective block comprising only insignificant pixels, on the other hand, outputting the image data of the second reproduced block as it is when the second reproduced block is an effective block including at least one significant pixel; and generating image data of a second prediction block for a second target block in the frame to be processed next in accordance with the image data of the effective block and the image data of the padded ineffective block. Therefore, the complexity of a padding process in a hierarchical decoding process for the hierarchically coded signal at the receiving end can be significantly reduced, without degrading the coding efficiency and the image quality.

According to a sixth aspect of the present invention, there is provided an image processing method for performing hierarchical decoding on a first coded image signal having a first resolution and a second coded image signal having a second resolution different from the first resolution, the coded image signals being obtained by performing hierarchical coding on an image signal corresponding to each frame forming an image space including an object of an arbitrary shape, for each of plural blocks into which the image space is divided. This method comprises a first decoding process for the first coded image signal and a second decoding process for the second coded image signal. The first decoding process comprises: performing data analysis on the first coded image signal to generate, as image data of a first compressed difference block, compressed data obtained by compressing first difference data between image data of a target block to be coded having the first resolution and image data of a prediction block for the target block; decompressing the image data of the first compressed difference block to restore the first difference data as image data of a first decompressed difference block in a frame which is presently processed; adding the image data of the first decompressed difference block and image data of a prediction block for the first decompressed difference block to generate image data of a first reproduced block; outputting the image data of the first reproduced block after replacing insignificant pixel values constituting the first reproduced block with a predetermined padding value when the first reproduced block is an ineffective block comprising only insignificant pixels, on the other hand, outputting the image data of the first reproduced block as it is when the first reproduced block is an effective block including at least one significant pixel; and generating image data of a prediction block for a first decompressed difference block in a frame to be processed next in accordance with the image data of the effective block and the image data of the padded ineffective block, and generating resolution-converted data of the first reproduced block by performing resolution conversion to convert the first resolution to the second resolution. The second decoding process comprises the steps of: performing data analysis on the second coded image signal to generate, as image data of a second compressed difference block, compressed data obtained by compressing second difference data between image data of a target block to be coded having the second resolution and image data of a prediction block for the target block; decompressing the image data of the second compressed difference block to restore the second difference data as image data of a second decompressed difference block in the frame which is presently processed; performing weighted averaging on image data of a prediction block for the second decompressed difference block and the resolution-converted data to generate weighted average prediction data; adding the image data of the second decompressed difference block and the weighted average prediction data to generate image data of a second reproduced block; outputting the image data of the second reproduced block after replacing insignificant pixel values constituting the second reproduced block with a predetermined padding value when the second reproduced block is an ineffective block comprising only insignificant pixels, on the other hand, outputting the image data of the second reproduced block as it is when the second reproduced block is an effective block including at least one significant pixel; and generating image data of a second prediction block for a second decompressed difference block in the frame to be processed next, in accordance with the image data of the effective block and the image data of the padded ineffective block. Therefore, the complexity of the padding process in the hierarchical decoding process for the hierarchically coded signal can be significantly reduced, without degrading the coding efficiency and the image quality.

According to a seventh aspect of the present invention, there is provided an image processing apparatus for coding an image signal corresponding to each frame forming an image space including an object of an arbitrary shape, for each of plural blocks into which the image space is divided. This apparatus comprises: subtraction device operable to output difference data between image data of a target block to be coded in a frame which is presently processed and image data of a prediction block for the target block, as image data of a difference block; a data compressor operable to subject the image data of the difference block to a predetermined data compression process to output image data of a compressed difference block; a data decompressor operable to subject the image data of the compressed difference block to a predetermined data decompression process to restore the difference data as image data of a decompressed difference block; addition device operable to add the image data of the decompressed difference block and the image data of the prediction block to generate image data of a reproduced block; padding device operable to output the image data of the reproduced block after replacing insignificant pixel values constituting the reproduced block with a predetermined padding value when the reproduced block is an ineffective block comprising only insignificant pixels, and outputting the image data of the reproduced block as it is when the reproduced block is an effective block including at least one significant pixel; a frame memory operable to store, as reference image data, the image data of the effective block and the image data of the padded reproduced block which are output from the padding device; and prediction data generation device operable to generate image data of a prediction block for a target block in a frame to be processed next, from the reference image data stored in the frame memory. Therefore, the complexity of a padding process in a decoding process for reproduction at the receiving end can be significantly reduced, without degrading the coding efficiency and the image quality.

According to an eighth aspect of the present invention, there is provided an image processing apparatus for decoding a coded image signal obtained by coding an image signal corresponding to each frame forming an image space including an object of an arbitrary shape, the coding and decoding being performed for each of plural blocks into which the image space is divided. This apparatus comprises: a data analyzer operable to perform data analysis on the coded image signal to generate, as image data of a compressed difference block, compressed data obtained by compressing difference data between image data of a target block to be coded and image data of a prediction block for the target block; a data decompressor operable to decompress the image data of the compressed difference block to restore the difference data as image data of a decompressed difference block in a frame which is presently processed; addition device operable to add the image data of the decompressed difference block and the image data of the prediction block to generate image data of a reproduced block; padding device operable to output the image data of the reproduced block after replacing insignificant pixel values constituting the reproduced block with a predetermined padding value when the reproduced block is an ineffective block comprising only insignificant pixels, and output the image data of the reproduced block as it is when the reproduced block is an effective block including at least one significant pixel; a frame memory operable to store the image data of the effective block and the image data of the padded reproduced block, as reference image data; and prediction data generation device operable to generate image data of a prediction block for a decompressed difference block in a frame to be processed next, from the reference image data stored in the frame memory. Therefore, the complexity of the padding process in the decoding process can be significantly reduced without degrading the coding efficiency and the image quality.

According to a ninth aspect of the present invention, there is provided an image processing apparatus for coding an image signal corresponding to each frame forming an image space including an object of an arbitrary shape, for each of plural blocks into which the image space is divided. This apparatus comprises: subtraction device operable to output difference data between image data of a target block to be coded in a frame which is presently processed and image data of a prediction block for the target block, as image data of a difference block; a data compressor operable to subject the image data of the difference block to data compression to output image data of a compressed difference block; a data decompressor operable subject the image data of the compressed difference block to data decompression to restore the difference data as image data of a decompressed difference block; addition device operable to add the image data of the decompressed difference block and the image data of the prediction block to generate image data of a reproduced block; a frame memory operable to store the image data of the reproduced block as reference image data; initialization device operable to initialize the frame memory at a predetermined timing; data supply control device disposed between the addition means and the fame memory, operable control supply of the image data of the reproduced block from the addition device to the frame memory; and prediction data generation device operable to generate image data of a prediction block for a target block in a frame to be processed next, from the reference image data stored in the frame memory. In this apparatus, the data supply control device outputs the image data of the reproduced block so that the image data is overwritten in the initialized frame memory, only when the reproduced block is an effective block including at least one significant pixel, in accordance with significant pixel information which is included in the image signal and indicates whether each of the pixels constituting the reproduced block is a significant pixel positioned inside the object or an insignificant pixel positioned outside the object. Therefore, at the receiving end, it is not necessary to perform padding for not only the boundary blocks but also the ineffective blocks amongst the reproduced blocks, whereby a padding process can be dispensed with in a decoding process for reproduction, without degrading the coding efficiency and the image quality.

According to a tenth aspect of the present invention, there is provided an image processing apparatus for decoding a coded image signal obtained by coding an image signal corresponding to each frame forming an image space including an object of an arbitrary shape, the coding and decoding being performed for each of plural blocks into which the image space is divided. This apparatus comprises: a data analyzer operable to perform data analysis on the coded image signal to generate, as image data of a compressed difference block, compressed data obtained by compressing difference data between image data of a target block to be coded and image data of a prediction block for the target block; a data decompressor operable to decompress the image data of the compressed difference block to restore the difference data as image data of a decompressed difference block in a frame which is presently processed; addition device operable to add the image data of the decompressed difference block and the image data of the prediction block to generate image data of a reproduced block; a frame memory operable to store the image data of the reproduced block as reference image data; initialization device operable to initialize the frame memory at a predetermined timing; data supply control device disposed between the addition device and the frame memory, operable to control supply of the image data of the reproduced block from the addition device to the frame memory; and prediction data generation device operable to generate image data of a prediction block for a decompressed difference block in a frame to be processed next, from the reference image data stored in the frame memory. In this apparatus, the data supply control device outputs the image data of the reproduced block so that the image data is overwritten in the initialized frame memory, only when the reproduced block is an effective block including at least one significant pixel, in accordance with significant pixel information which is included in the coded image signal and indicates whether each of the pixels constituting the reproduced block is a significant pixel positioned inside the object or an insignificant pixel positioned outside the object. Therefore, it is not necessary to perform padding for not only the boundary blocks but also the ineffective blocks amongst the reproduced blocks, whereby a padding process can be dispensed with in the decoding process for reproduction, without degrading the coding efficiency and the image quality.

According to an eleventh aspect of the present invention, there is provided an image processing apparatus for performing hierarchical coding on an image signal corresponding to each frame forming an image spaced including an object of an arbitrary shape, for each of plural blocks into which the image space is divided. This apparatus comprise: a preprocessor operable to generate as image data of target blocks to be subjected to the hierarchical coding, image data of a first target block having a first resolution and image data of a second target block having a second resolution different from the first resolution; and a first coding unit operable to subject the image data of the first target block to data compression and coding, and a second coding unit operable to subject the image data of the second target block to data compression and coding. The first coding unit comprises: first subtraction device operable to output first difference data between the image data of the first target block in a frame which is presently processed and image data of a first prediction block for the first target block, as image data of a first difference block; a first data compressor operable to compress the image data of the first difference block to generate image data of a first compressed difference block; a first data decompressor operable to decompress the image data of the first compressed difference block to restore the first difference data as image data of a first decompressed difference block; first addition device operable to add the image data of the first decompressed difference block and the image data of the first prediction block to generate image data of a first reproduced block; first padding device operable to output the image data of the first reproduced block after replacing insignificant pixel values constituting the first reproduced block with a predetermined padding value when the first reproduced block is an ineffective block comprising only insignificant pixels, and output the image data of the first reproduced block as it is when the first reproduced block is an effective block including at least one significant pixel; a first frame memory operable to store, as reference image data, the image data of the effective block and the image data of the padded ineffective data which are output from the first padding device; first prediction data generation device operable to generate image data of a first prediction block for a first target block in a frame to be processed next, from the reference image data stored in the first frame memory; and resolution conversion device operable to subject the image data output from the first frame memory or the image data output from the first padding device to resolution conversion by which the resolution of the output image data is made equal to the second resolution, thereby generating resolution-converted image data. The second coding unit comprises: weighted averaging device operable to perform weighted averaging of the resolution-converted data and image data of a second prediction block for the second target block in the frame which is presently processed, to generate weighted average prediction data; second subtraction device operable to output second difference data between the image data of the second target block and the weighted average prediction data, as image data of a second difference block; a second data compressor operable to compress the image data of the second difference block to generate image data of a second compressed difference block; a second data decompressor operable to decompress the image data of the second compressed difference block to restore the second difference data as image data of a second decompressed difference block; second addition device operable to add the image data of the second decompressed difference block and the image data of the second prediction block to generate image data of a second reproduced block; second padding device operable to output the image data of the second reproduced block after replacing insignificant pixel values constituting the second reproduced block with a predetermined padding value when the second reproduced block is an ineffective block comprising only insignificant pixels, and output the image data of the second reproduced block as it is when the second reproduced block is an effective block including at least one significant pixel; a second frame memory operable to store, as reference image data, the image data of the effective block and the image data of the padded inefficient data which are output from the second padding device; and second prediction data generation device operable to generate image data of a second prediction block for a second target block in a frame to be processed next, from the reference image data stored in the second frame memory. Therefore, the complexity of a padding process in a hierarchical decoding process for the hierarchically coded signal at the receiving end can be significantly reduced, without degrading the coding efficiency and the image quality.

According to a twelfth aspect of the present invention, there is provided an image processing apparatus for performing hierarchical decoding on a first coded image signal having a first resolution and a second coded image signal having a second resolution different from the first resolution, the coded image signals being obtained by performing hierarchical coding on an image signal corresponding to each frame forming an image space including an object of an arbitrary shape, for each of plural blocks into which the image space is divided. This apparatus comprises a first decoding unit operable to decode the first coded image signal and a second decoding unit operable to decode the second coded image signal. The first decoding unit comprises: a first data analyzer operable to perform data analysis on the first coded image signal to generate, as image data of a first compressed difference block, compressed data obtained by compressing first difference data between image data of a target block to be coded having the first resolution and image data of a prediction block operable to the target block; a first data compressor for decompress the image data of the first compressed difference block to restore the first difference data as image data of a first decompressed difference block in a frame which is presently processed; first addition device operable to add the image data of the first decompressed difference block and image data of a prediction block for the first decompressed difference block, to generate image data of a first reproduced block; first padding device operable to output the image data of the first reproduced block after replacing insignificant pixel values constituting the first reproduced block with a predetermined padding value when the first reproduced block is an ineffective block comprising only insignificant pixels, and outputting the image data of the first reproduced block as it is when the first reproduced block is an effective block including at least one significant pixel; a first frame memory operable to store, as reference image data, the image data of the effective block and the image data of the padded ineffective block; first prediction data generation device operable to generate image data of a first prediction block for a first decompressed difference block in a frame to be processed next, from the reference image data stored in the first frame memory; and resolution conversion device operable to subject the image data output from the first frame memory or the image data output from the first padding device to resolution conversion by which the resolution of the output image data is made equal to the second resolution, thereby generating resolution-converted image data. The second decoding unit comprises: a second data analyzer operable to perform data analysis on the second coded image signal to generate, as image data of a second compressed difference block, compressed data obtained by compressing second difference data between image data of a target block to be coded having the second resolution and image data of a prediction block for the target block; a second data decompressor operable to decompress the image data of the second compressed difference block to restore the second difference data as image data of a second decompressed difference block in the frame which is presently processed; weighted averaging device operable to perform weighted averaging on image data of a prediction block for the second decompressed difference block and the resolution-converted data output from the resolution conversion device, to generate weighted average prediction data; second addition device operable to add the image data of the second decompressed difference block and the weighted average prediction data to generate image data of a second reproduced block; second padding device operable to output the image data of the second reproduced block after replacing insignificant pixel values constituting the second reproduced block with a predetermined padding value when the second reproduced block is an ineffective block comprising only insignificant pixels, and output the image data of the second reproduced block as it is when the second reproduced block is an effective block including at least one significant pixel; a second frame memory operable to store, as reference image data, the image data of the effective block and the image data of the padded ineffective block; and second prediction data generation device operable to generate image data of a prediction block for a second decompressed difference block in the frame to be processed next, from the reference image data stored in the second frame memory. Therefore, the complexity of the padding process in the hierarchical decoding process for the hierarchically coded signal can be significantly reduced, without degrading the coding efficiency and the image quality.

According to a thirteenth aspect of the present invention, there is provided a data storage medium containing a program which enables a computer to perform processing of an image signal corresponding to an object having an arbitrary shape, the program being constructed such that it enables the computer to perform an image coding or decoding process by the image processing method according to any of the first to sixth aspects.

BRIEF DESCRIPTION OF THE DRAWINGS

FIGS. 1(a) and 1(b) are block diagrams for explaining an image coding apparatus according to a first embodiment of the invention, wherein FIG. 1(a) shows the schematic structure of the apparatus and FIG. 1(b) shows the structure of a texture coding unit as a component of the apparatus.

FIGS. 3(a) and 3(b) are block diagrams for explaining an image decoding apparatus according to a second embodiment of the invention, wherein FIG. 3(a) shows the schematic structure of the apparatus and FIG. 3(b) shows the structure of a texture decoding unit as a component of the apparatus.

FIGS. 4(a) and 4(b) are block diagrams for explaining an image coding apparatus according to a third embodiment of the invention, wherein FIG. 4(a) shows the schematic structure of the apparatus and FIG. 4(b) shows the structure of a texture coding unit as a component of the apparatus.

FIGS. 5(a) and 5(b) are block diagrams for explaining an image decoding apparatus according to a fourth embodiment of the invention, wherein FIG. 5(a) shows the schematic structure of the apparatus and FIG. 5(b) shows the structure of a texture decoding unit as a component of the apparatus.

DETAILED DESCRIPTION OF THE PREFERRED EMBODIMENTS

Hereinafter, embodiments of the present invention will be described with reference to the drawings.

EMBODIMENT 1

Figure 1:
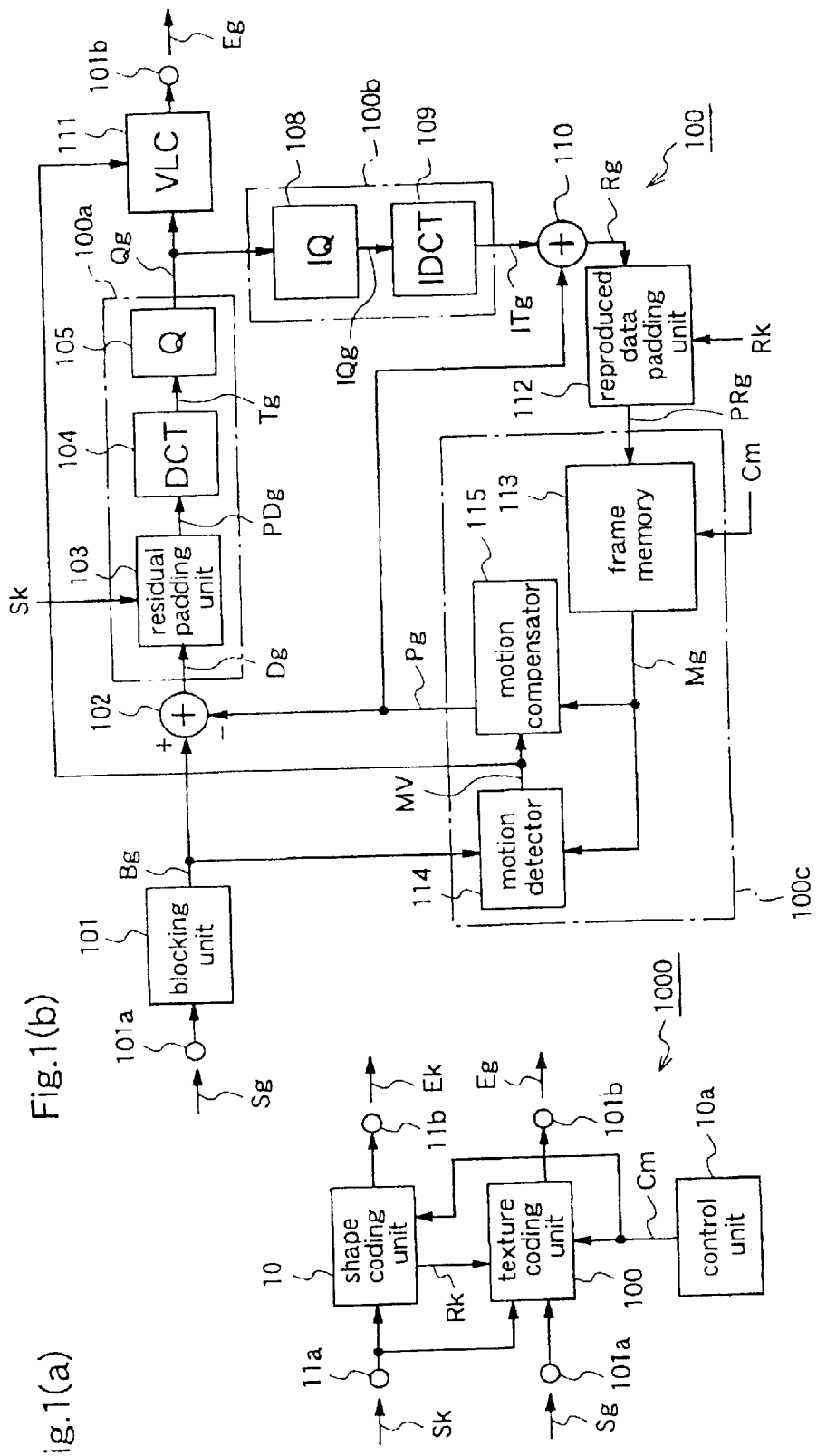

FIGS. 1(a) and 1(b) are block diagrams for explaining an arbitrary shape coding apparatus as an image processing apparatus according to a first embodiment of the present invention. FIG. 1(a) shows the entire structure of the apparatus and FIG. 1(b) shows the structure of a texture coding unit included in the apparatus.

An arbitrary shape coding apparatus (image coding apparatus) 1000 of this first embodiment receives a digital image signal (arbitrarily shaped image signal) of each frame corresponding to an object (arbitrarily shaped image) as a component of a display image, and encodes the digital image signal for each of plural blocks into which a region including the object (object region) is divided.

The arbitrary shape image signal include a texture signal Sg representing the gradation in color of an arbitrarily shaped image (object) and a shape signal (significant signal) Sk indicating the shape of the arbitrarily shaped image (object). The texture signal comprises a luminance signal and a chrominance signal for representing the texture of the object. The shape signal indicates whether the respective samples (pixels) in an image space formed by the texture signal are positioned inside the object or not. For example, when the pixels constituting the image space are positioned inside the object, these pixels are significant pixels, and when the pixels constituting the image space are positioned outside the object, these pixels are insignificant pixels.

In this first embodiment, when the sample values composing the texture signal do not correspond to significant pixels, the sample values of the corresponding shape signal are "0". When the sample values composing the texture signal correspond to significant pixels, the sample values of the corresponding shape signal are other than "0".

Further, although in this first embodiment an input image signal corresponding to one frame in one object region is divided into image signals corresponding to plural blocks each comprising 8×8 samples or 16×16 samples, the shape of the block and the number of the samples are not restricted thereto. Further, blocks comprising only insignificant samples are called ineffective blocks or perfectly transparent blocks, and blocks other than those are called effective blocks. The effective blocks are divided into two groups: blocks in which all the pixels are significant, and blocks in which only some pixels are significant. The former is called nontransparent blocks and the latter is called boundary blocks. That is, in the nontransparent block, the texture of the object in the object region is displayed as the foreground. In the boundary block, the boundary of the object is shown in the block.

Figure 2:
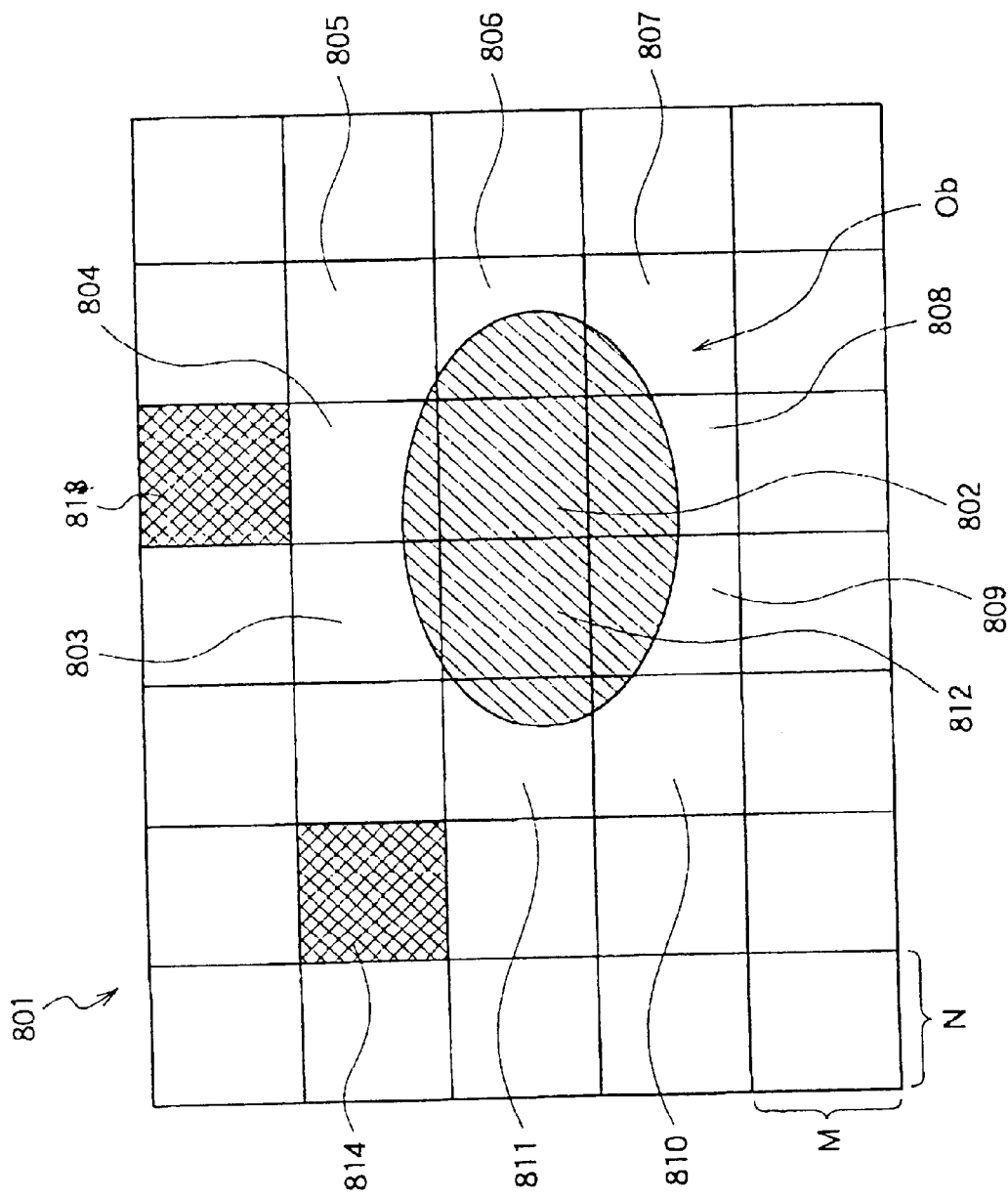
FIG. 2 is a diagram for explaining the process of the texture coding unit of the first embodiment, illustrating an image space which includes an arbitrarily shaped image and is divided into plural blocks.

FIG. 2 is a schematic diagram illustrating an object region corresponding to an arbitrarily shaped image (object), wherein each square corresponds to a block comprising M×N pixels. In FIG. 2, reference numeral 801 denotes an object region including an elliptical image (object) Ob which is an arbitrarily shaped image. In the object region 801, a hatched region is an internal region of the object, and a region other than the hatched region is a region outside the object. Further, in the object region 801, blocks 803~812 are boundary blocks, a block 802 is a nontransparent block, and blocks other than the blocks 802~812 are ineffective blocks.

Hereinafter, the arbitrary shape coding apparatus 1000 will be described in more detail.

The arbitrary shape coding apparatus 1000 includes a shape coding unit 10, a texture coding unit 100, and a control unit 10a. The shape coding unit 10 receives, at an input terminal 11a, a shape signal Sk which is included in the above-described digital image signal and indicates the shape of an object, and performs arithmetic coding and variable-length coding on the shape signal Sk for each frame to output a coded shape signal Ek toward an output terminal 11b. The texture coding unit 100 receives, at an input terminal 101a, a texture signal Sg (a luminance signal and a chrominance signal) included in the digital image signal and indicating the gradation in color of the object, and performs data compression and variable-length coding on the texture signal Sg for each frame to output a coded texture signal Eg toward an output terminal 101b. The control unit 10a controls the coding process of each coding unit.

The texture coding unit 100 as a constituent of the arbitrary shaped coding apparatus 1000 includes a blocking unit 101 and a prediction data generation unit 100c. The blocking unit 101 divides the texture signal Sg which is applied to the input terminal 101a and corresponds to each frame, into texture signals corresponding to plural blocks (image spaces) each comprising 16×16 pixels (unit of coding), and outputs image data corresponding to each block. The prediction data generation unit 100c generates prediction data (data of a prediction block) Pg corresponding to data Bg of a target block (a block to be coded) in the frame which is presently processed (hereinafter referred to as "present frame").

Further, the texture coding unit 100 includes a first adder 102, a data compressor 100a, and a variable-length coder (VLC) 111. The first adder 102 outputs difference data between the data Bg of the target block and the data Pg of the prediction block, as data Dg of a residual block (prediction error signal). The data compressor 100a subjects the output Dg of the first adder 102 to data compression to output data Qg of a compressed residual block. The VLC 111 subjects the output Qg of the data compressor 100a to variable-length coding to output a coded texture signal Eg to the output terminal 101b.

The data compressor 100a comprises a residual padding unit 103, a DCT unit 104, and a quantizer 105. The residual padding unit 103 performs a padding process for the data Dg of the residual block, in which pixel values of insignificant pixels amongst the pixels composing the image space formed by the data Dg are replaced with a predetermined padding value "0" in accordance with the shape signal Sk of the target block. The DCT unit 104 subjects the output PDg of the padding unit 103 (data of a padded residual block) to discrete cosine transformation (DCT). The quantizer 105 quantizes the output Tg of the DCT unit 104 to output quantized coefficients as the data Qg of the compressed difference block.

The DCT is performed in units of subblocks each comprising 8×8 pixels, obtained by dividing the block of 16×16 pixels into four.

Further, the texture coding unit 100 includes a data decompressor 100b, a second adder 110, and a reproduced data padding unit 112. The data decompressor 100b decompresses the output Qg of the data compressor 100a to output data ITg of a decompressed difference block. The second adder 110 adds the data ITg of the decompressed difference block to the data Pg of the prediction block to output data Rg of a reproduced block. The reproduced data padding unit 112 performs padding on the output Rg of the second adder 110. The data decompressor 100b comprises an inverse quantizer 108 which inversely quantizes the output Qg of the data compressor 100a, and an IDCT unit 109 which subjects the output IQg of the inverse quantizer 108 to inverse DCT (transformation of frequency-domain data to space-domain data) and outputs the data ITg of the decompressed difference block.

The reproduced data padding unit 112 performs padding on only ineffective blocks in which all the pixels are insignificant amongst the reproduced blocks, whereby the pixel values of the insignificant pixels are replaced with padding values. Amongst the reproduced blocks, effective blocks each including at least one insignificant pixel are not subjected to padding. The decision as to whether padding is performed or not is based on the shape data Rk of the reproduced block generated in the shape coding unit 10. As described above, the effective blocks comprise boundary blocks including the boundary of the object and nontransparent blocks all pixels of which are positioned inside the object.

Moreover, the prediction data generation unit 100c comprises a frame memory 113, a motion detector 114, and a motion compensator 115. The frame memory 113 stores the output PRg from the reproduced data padding unit 112 (padded data of a reproduced block), as reference image data for a frame to be processed next. The motion detector 114 detects a motion vector MV corresponding to the target block in the present frame in accordance with the reference image data Mg for the present frame stored in the frame memory 113 and the data Bg of the target block. The motion compensator 115 generates an address of the frame memory 113 in accordance with the motion vector MV output from the motion detector 114, and outputs, as the data Pg of the prediction block, image data of a memory region corresponding to the address from the reference image data Mg corresponding to the present frame.

Although only the structure of the texture coding unit 100 has been described in detail, the structure of the shape coding unit 10 is similar to the texture coding unit 100. To be specific, the shape coding unit 10 does not have the residual padding unit 103 and the reproduced data padding unit 112. Further, it has an arithmetic encoder which compressively codes a shape signal of each block by a method of quad-tree, in place of the DCT nit 104 and the quantizer 105, and an arithmetic decoder adapted to the arithmetic encoder, in place of the data decompressor 100b comprising the inverse quantizer 105 and the inverse DCT unit 104.

A description is now given of the operation.

When an arbitrarily shaped image signal is input to the coding apparatus of this first embodiment, the shape signal Sk as a component of the arbitrarily shaped image signal is subjected to arithmetic coding and variable-length coding in the shape coding unit 10 to be coded frame by frame, while the texture signal Sg as a component of the arbitrarily shaped image signal is subjected to data compression and variable-length coding in the texture coding unit 100 to be coded frame by frame.

Hereinafter, coding of the texture signal by the texture coding unit 100 will be described in detail.

When the texture signal Sg corresponding to the arbitrarily shaped image is applied to the input terminal 101a of the texture coding unit 100, the blocking unit 101 divides the texture signal Sg into texture signals corresponding to plural blocks into which the object region is divided, and each texture signal is output as data Bg corresponding to each block. The data Bg of a target block to be coded is input to the motion detector 114. At this time, data Mg of an image reproduced in the past (reference image) which is stored in the frame memory 113 is also input to the motion detector 114. In the motion detector 114, motion displacement information, which gives a prediction block having image data of the smallest error from the image data Bg of the target block, is obtained in accordance with the reference image data Mg for the present frame by a method like block matching, and a motion vector MV is output.

When the motion vector MV is applied to the motion compensator 115, data Pg of a prediction block for the target block is generated from the reference image data for the present frame. The motion vector MV is also sent to the VLC 11, wherein it is transformed into a variable-length code to be output to the output terminal 101b.

The data Bg of the target block and the data Pg of the prediction block are input to the first adder 102, wherein a difference between these image data is obtained by subtraction, as data Dg of a residual block. The data Dg of the residual block is padded in the residual padding unit 103 by a predetermined method, and data PDg of the padded residual block is output from the residual padding unit 103. In the padding process by the residual padding unit 103, pixel values of insignificant pixels included in the residual block are replaced with a predetermined padding value "0".

A target padding unit which performs padding for the output (data of the target block) Bg of the blocking unit 101 in accordance with the shape signal Sk, may be placed before the adder 102. In this case, the target padding unit smoothes the pixel values of pixels positioned at the object boundary in the target block. Further, the target padding unit performs padding for at least the boundary blocks among the ineffective blocks and the boundary blocks. The padding process of the target padding unit is not restricted to that mentioned above. It may perform a process of replacing significant sample values at the object boundary with pixel values of insignificant pixels, repeatedly for insignificant pixels outside the object.

Next, the data PDg of the padded residual block is subjected to data compression. To be specific, the data PDg is transformed to frequency components Tg by discrete cosine transformation (DCT) in the DCT unit 104, and the frequency components Tg are transformed to quantized coefficients Qg by quantization in the quantization unit 105 to be output as data of the compressed block. The data Qg of the compressed block are transformed to variable-length codes in the VLC 111, and the variable-length codes are output from the output terminal 101b, together with coded data of side information including the motion vector, as a coded image signal Eg.

In this first embodiment, amongst the target blocks, with respect to the ineffective blocks including only insignificant samples, their texture signals (luminance signals and chrominance signals) are not transmitted to the receiving end. That is, the texture coding unit 100 is constructed so that it does not transmit the coded image signals (coded texture signals) corresponding to the ineffective blocks to the receiving end. Thereby, the quantity of codes transmitted from the transmission end to the receiving end is significantly reduced.

On the other hand, the data Qg of the compressed block is subjected to data decompression in the data decompressor 100b. To be specific, the data Qg of the compressed block is transformed to frequency components IQg by inverse quantization in the inverse quantizer 108, and the frequency components IQg are restored to space-domain data ITg in the IDCT unit 109. The space-domain data ITg is a restored signal (data of a decompressed block) corresponding to the data Dg of the padded residual block. The data ITg of the decompressed block is added to the data Pg of the prediction block in the second adder 110, and the result of the addition is supplied to the reproduced data padding unit 112 as data Rg of a reproduced block.

In the reproduced data padding unit 112, amongst the data Rg of the sequentially input reproduced blocks, the data of ineffective blocks comprising only insignificant samples are subjected to padding, thereby defining the values of the samples of the ineffective blocks. On the other hand, no padding is performed on effective reproduced blocks including the boundary blocks. At this time, in the reproduced data padding unit 112, it is decided whether each reproduced block is an ineffective block or not, based on the shape data Rk of the reproduced block from the shape coding unit 10, i.e., based on the information indicating whether the sample values constituting the data of the reproduced block are significant or not. Further, in this first embodiment, the pixel values of the respective pixels constituting the ineffective block, i.e., the values of the luminance components and chrominance components, are replaced with a predetermined padding value "128".

The padding value used for the replacement may be changed for each frame. In this case, the padding value of each frame (only the value of the luminance signal, or both of the values of the luminance and chrominance signals) must be coded by the variable-length coder 111 to be sent to the receiving end. Further, the padding process for the ineffective block may be to repeat the process of replacing the significant sample values of an effective block adjacent to the ineffective block with insignificant sample values.

The output (padded data of the reproduced block) PRg from the reproduced data padding unit 112 is stored in the frame memory, as reference image data for a frame to be processed next, in accordance with the memory control signal Cm from the control unit 10a.

As described above, according to the first embodiment of the present invention, the padding process for the image data Rg of the reproduced blocks is performed on only ineffective blocks having no data corresponding to the luminance and chrominance signals, and the result is stored in the frame memory 113 as reference image data. Therefore, at the receiving end, the padding process in the decoding process for reproduction can be significantly reduced. Especially when the padding process uses the pixel values at the object boundary as padding values, detection of the boundary of the arbitrary shape can be dispensed with.

While in this first embodiment DCT is employed as a data compression process, shape-adaptive DCT, sub-band coding, or wavelet coding may be employed.

Further, while in this first embodiment the residual padding unit 103 used the uncompressed shape signal Sk as a shape signal to be referred to in the padding process, the residual padding unit 103 may use a decompressed shape signal (data of the reproduced block) Rk obtained by decompressing the compressed shape signal in the shape coding unit 10.

Further, while in this first embodiment the residual padding unit 103 is placed on the output side of the first adder 102, it may be placed before the first adder 102. In this case, the image signals of the boundary blocks amongst the residual blocks are subjected to data compression after being padded. Therefore, at the decoding end, all the sample values constituting the data of the boundary blocks have already been defined, so that padding for the boundary blocks is not necessary.

Also in this case, an uncompressed shape signal is used as a shape signal to be referred to in the padding process. However, the reference shape signal may be a decompressed shape signal obtained by decompressing a compressed shape signal in the shape coding unit.

Embodiment 2

Figure 3:
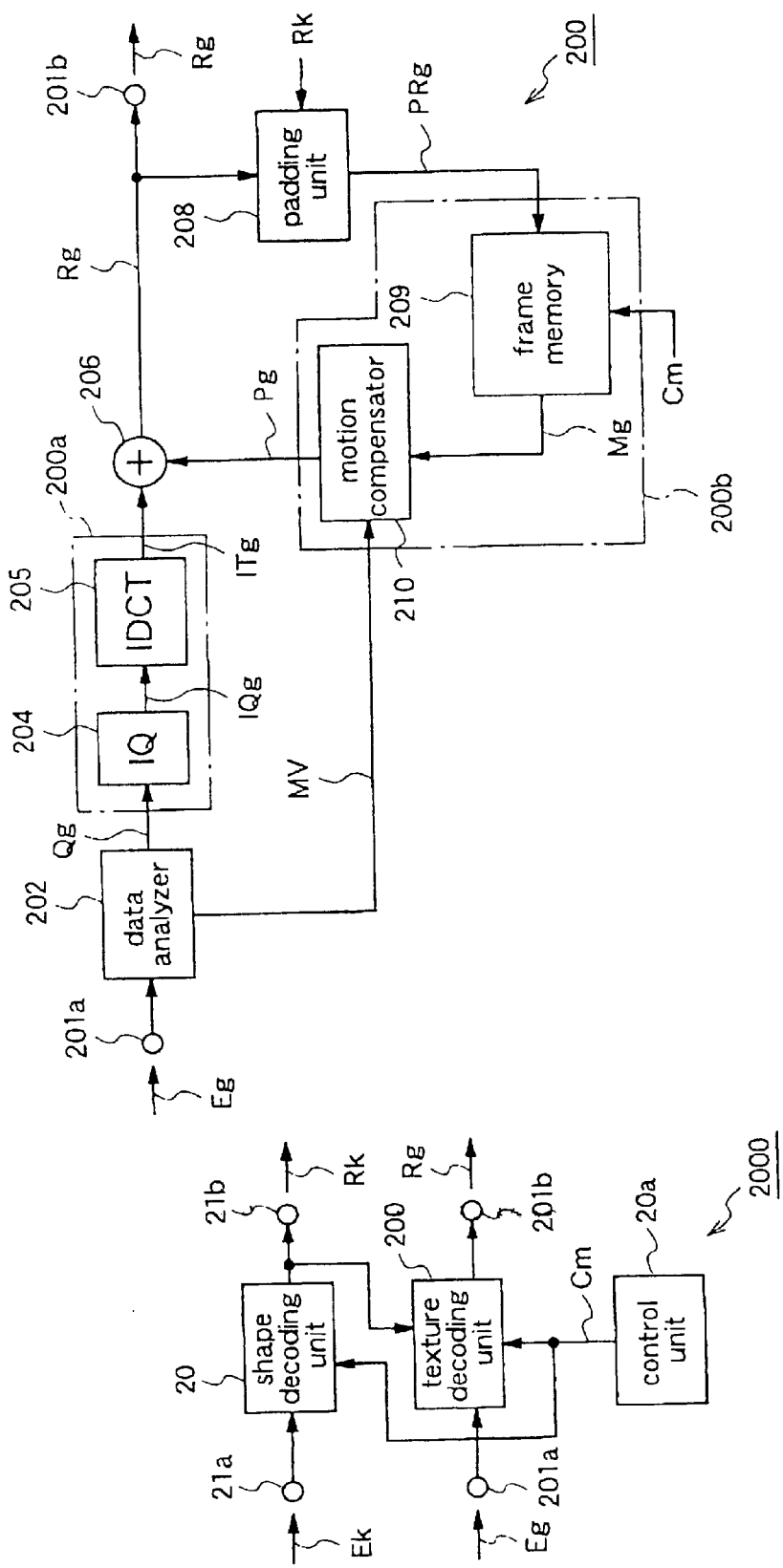

FIGS. 3(a) and 3(b) are block diagrams for explaining an arbitrary shape decoding apparatus as an image processing apparatus according to a second embodiment of the present invention, wherein FIG. 3(a) shows the whole structure of the apparatus and FIG. 3(b) shows the structure of a texture decoding unit included in the apparatus.

An arbitrary shape decoding apparatus (image decoding apparatus) 2000 of this second embodiment receives a coded shape signal Ek and a coded texture signal Eg corresponding to each frame, which are output from the arbitrary shape coding apparatus 1000 of the first embodiment, and decodes these signals for each of plural blocks into which an object region is divided.

The arbitrary shape decoding apparatus 2000 includes a shape decoding unit 20, a texture decoding unit 200, and a control unit 20a. The shape decoding unit 20 receives, at an input terminal 21a, the coded shape signal Ek output from the arbitrary shape coding apparatus 1000, and performs data analysis and arithmetic decoding on the coded shape signal Ek frame by frame to output a reproduced shape signal Rk to an output terminal 21b. The texture decoding unit 200 receives, at an input terminal 201a, the coded texture signal Eg output from the arbitrary shape coding apparatus 1000, and performs data analysis and data decompression on the coded texture signal Eg frame by frame to output a reproduced texture signal Rg to an output terminal 201b. The control unit 20a controls the decoding processes in the decoding units 20 and 200.

The texture decoding unit 200 includes a data analyzer 202, a data decompressor 200a, and an adder 206. The data analyzer 202 receives a coded texture signal Eg of a target region (target block) to be decoded, analyzes the coded texture signal Eg, and subjects the coded texture signal Eg to variable-length decoding. The data decompressor 200a decompresses the output Qg of the data analyzer 202 and outputs data ITg of a decompressed block in the present frame. The adder 206 adds the data ITg of the decompressed residual block from the data decompressor 200a to data Pg of a prediction block for the decompressed residual block. The output Rg of the adder 206 is output from the texture decoding unit 200 as a reproduced texture signal.

The data decompressor 200a comprises an inverse quantizer 204 which inversely quantizes the output Qg of the data analyzer 202, and an IDCT unit 205 which subjects the output IQg of the inverse quantizer 204 to IDCT (inverse discrete cosine transform) that is a kind of inverse frequency transformation and outputs the data ITg of the decompressed block.

Further, the texture decoding unit 200 includes a padding unit 208 and a prediction signal generation unit 200b. The padding unit 208 subjects the data Rg of the reproduced block output from the adder 206 to a padding process based on the reproduced shape signal Rk output from the shape coding unit 20, thereby outputting data PRg of a reproduced and padded block. The prediction signal generation unit 200b generates the data Pg of the prediction block in accordance with the data PRg of the reproduced and padded block and the motion vector MV output from the data analyzer 202.

The reproduced shape signal Rk is information indicating whether the pixels composing each reproduced block are positioned inside the object or not. The padding unit 208 receives the reproduced shape signal Rk as a control signal, and performs a padding process of replacing the pixel values of insignificant pixels with a predetermined padding value, on ineffective blocks all the pixels of which are insignificant pixels, amongst the reproduced blocks. The padding unit 208 does not perform the padding process on effective blocks including at least one significant pixel, amongst the reproduced blocks. The effective blocks comprise boundary blocks including the boundary of the object, and inside-object blocks all the pixels of which are positioned inside the object.

Further, the prediction signal generation unit 200b comprises a frame memory 209 and a motion compensator 210. The frame memory 209 stores the data PBg of the reproduced and padded block output from the padding unit 208, as image data of a reference frame for a frame to be processed next (reference image data), in a storage area for each block, in accordance with the memory control signal Cm output from the control unit 20a. The motion compensator 210 generates an address of the frame memory 209 in accordance with the data Mg stored in the frame memory 209 (reference image data for the present frame) and the motion vector MV of the target block decoded by the data analyzer 202, and generates, according to this address, data Pg of a prediction block corresponding to a decomposed difference block of the present frame from the data Mg stored in the frame memory 209.

Although in this second embodiment the structure of the texture decoding unit 200 is described in detail, the shape decoding unit 20 of the arbitrary shape decoding apparatus 2000 is similar to the texture decoding unit 200. That is, the shape decoding unit 20 is different from the texture decoding unit 200 only in that it does not have a padding unit, but has an arithmetic decoder performing decompressive decoding on a coded shape signal of each block by a method of quad-tree, in place of the inverse DCT unit 205 and the inverse quantizer 204.

A description is now given of the operation.

When the coded shape signal Ek and the coded texture signal Eg are input to the arbitrary shape decoding apparatus 2000 of this second embodiment, the coded shape signal Ek is subjected to data analysis and arithmetic coding in the shape decoding unit 20 to be decoded frame by frame, and the coded texture signal Eg is subjected to data analysis and data decompression in the texture decoding unit 200 to be decoded frame by frame.

Hereinafter, decoding of the coded texture signal Eg in the texture decoding unit 200 will be described in detail.

When the coded texture signal Eg is input to the input terminal 201a, it is analyzed by the data analyzer 202, whereby the data Qg of the compressed residual block (described for the texture coding unit 100 shown in FIG. 1), the motion vector MV, and the like are generated. The data Qg of the compressed residual block output from the data analyzer 202 is input to the data decompressor 200a while the motion vector MV output from the data analyzer 202 is input to the motion compensator 210.

In the data decompressor 200a, the data Qg of the compressed residual block is decompressed to restore the padded data PDg of the residual block (described for the texture coding unit 100), as data ITg of a decompressed residual block. In this second embodiment, the data Qg of the compressed residual block is transformed to frequency-domain data IQg in the inverse quantizer 204, and this data IQg is transformed to space-domain data in the IDCT unit 205 to be output as the data ITg of the decompressed residual block.

Further, in the motion compensator 210, and address for making an access to the frame memory 209 is generated in accordance with the motion vector MV from the data analyzer 202. Based on this address, data Pg of a prediction block is generated from data Mg which is stored in the frame memory 209 and serves as reference image data for a frame that is presently processed (hereinafter, referred to as "present frame"). In the adder 206, the data Pg of the prediction block and the data ITg of the decompressed residual block are added, whereby data Rg of a reproduced block is output to the output terminal 201b as a reproduced texture signal.

Meanwhile, in the padding unit 208, amongst the data of the reproduced blocks which are sequentially input, only the data of the ineffective reproduced blocks comprising insignificant samples are padded, whereby the values of the respective samples in the ineffective reproduced blocks are defined. On the other hand, the effective reproduced blocks (boundary blocks and inside-object blocks) are not padded. At this time, the padding unit 208 decides whether each reproduced block is an ineffective block or an effective block, based on the reproduced shape signal Rk from the shape decoding unit 20 which indicates whether the sample values of each reproduced block are significant or not. Further, in this second embodiment, a predetermined padding value "128" is used for padding value corresponding to the respective pixels composing the ineffective block (i.e., padding values of the luminance components and the chrominance components). The padding value used for the padding process may be changed for each frame. In this case, the padding value of each frame (i.e., only the value of the luminance signal, or the values of the luminance and chrominance signals) is included in the coded texture signal Eg, and it is extracted from the coded signal Eg by the data analyzer 202 to be sent to the padding unit 208.

Further, the padding process for the ineffective block may be to repeat the process of replacing the significant sample values of an effective block adjacent to the ineffective block with insignificant sample values.

The data PRg of the reproduced block so padded is stored in the frame memory 209 as reference image data for a frame to be processed next.

As described above, according to the second embodiment of the present invention, padding for the data Rg of the reproduced blocks is performed on the ineffective blocks having no data as luminance and chrominance signals while no padding is performed on the effective blocks including at least one significant pixel. Therefore, the padding process in decoding is significantly reduced.

Embodiment 3

Figure 4:
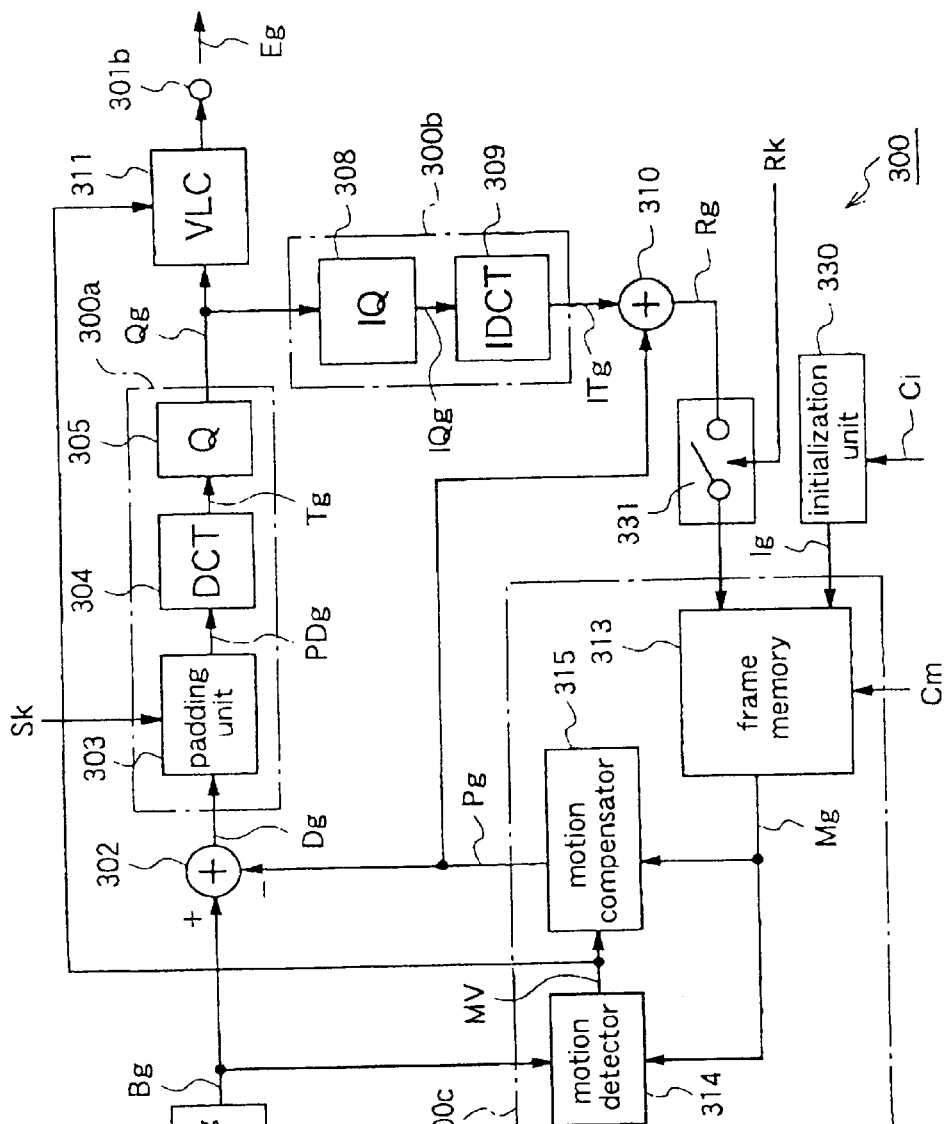
Figure 4:
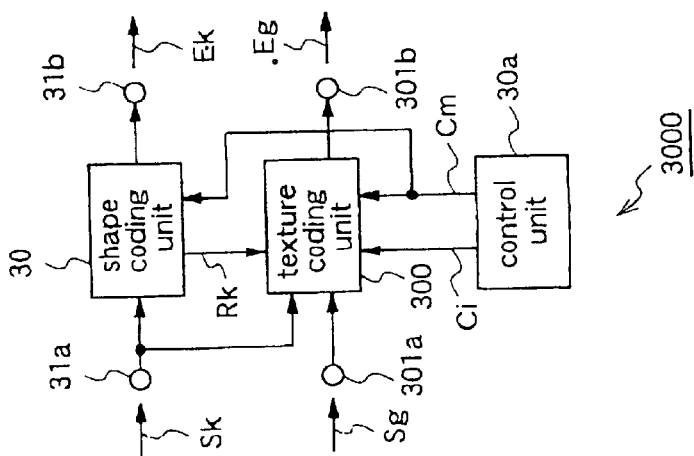

FIGS. 4(a) and 4(b) are block diagrams for explaining an arbitrary shape coding apparatus as an image processing apparatus according to a third embodiment of the present invention, wherein FIG. 4(a) shows the entire structure of the apparatus and FIG. 4(b) shows the structure of a texture coding unit as a component of the apparatus.

An arbitrary shape coding apparatus (image coding apparatus) 3000 of this third embodiment includes a shape coding unit 30, a texture coding unit 300, and a control unit 30a, like the arbitrary shape coding apparatus 1000 of the first embodiment. The shape coding unit 30 receives, at an input terminal 31a, a shape signal Sk which is included in a digital image signal and indicates the shape of an object, and performs arithmetic coding and variable-length coding on the shape signal Sk for each frame to output a coded shape signal Ek toward an output terminal 31b. The texture coding unit 300 receives, at an input terminal 301a, a texture signal Sg (a luminance signal and a chrominance signal) included in the digital image signal and indicating the gradation in color of the object, and performs data compression and variable-length coding on the texture signal Sg for each frame to output a coded texture signal Eg toward an output terminal 301b. The control unit 30a controls the coding process of each coding unit.

The shape coding unit 30 and the control unit 30a are identical to the shape coding unit 10 and the control unit 10a of the first embodiment, respectively. The texture coding unit 300 is different from the texture coding unit 100 of the first embodiment only in that it includes a switch 331 and an initialization unit 330 instead of the padding unit 112 of the first embodiment. The switch 331 controls supply of data Rg of a reproduced block to the frame memory 313 in accordance with a reproduced shape signal Rk from the shape coding unit 30, and the initialization unit 330 initializes reference image data for a frame which has previously been processed and stored in the frame memory 313, in accordance with an initialization control signal Ci from the control unit 30a.

Other components of the texture coding unit 300, i.e., a blocking unit 301, a data compressor 300a, a data decompressor 300b, a prediction signal generation unit 300c, first and second adders 302 and 310, and a variable-length coder (VLC) 311, are identical to the corresponding components 101, 100a, 100b, 100c, 102, 110, and 111 of the texture coding unit 100 according to the first embodiment. Further, a padding unit 303, a DCT unit 304, and a quantizer 305 constituting the data compressor 300a are identical to the residual padding unit 103, the DCT unit 104, and the quantizer 105 constituting the data decompressor 100a of the first embodiment, respectively. Further, an inverse quantizer 308 and an inverse DCT unit 309 constituting the data decompressor 300b are identical to the inverse quantizer 108 and the inverse DCT unit 109 constituting the data decompressor 100b of the first embodiment, respectively. Moreover, a motion detector 314, a motion compensator 315, and a frame memory 313 constituting the prediction signal generation unit 300c are identical to the motion detector 114, the motion compensator 115, and the frame memory 113 constituting the prediction signal generation unit 100c of the first embodiment, respectively.

Next, a description is given of the operation.

The fundamental operation of the arbitrary shape coding apparatus 3000 of this third embodiment is identical to that of the arbitrary shape coding apparatus 1000 of the first embodiment. So, only what differs from the first embodiment will be described hereinafter.

In this third embodiment, when coding an image signal Sg of one frame corresponding to an arbitrarily shaped image (object), the initialization unit 300 performs initialization of the frame memory 313 at a timing according to the initialization control signal Ci from the control unit 30a. For example, initialization of the frame memory 313 is performed at the timing when coding of a texture signal Sg corresponding to one frame has ended. Further, a predetermined pixel value "128" is employed as pixel values to be written in the frame memory by the initialization as a luminance signal and a chrominance signal of one frame.

Next, amongst the data Rg of the reproduced blocks from the second adder 310, only the data of the effective blocks including at least one significant sample are overwritten in the initialized frame memory 313. The overwrite in the frame memory 313 is controlled by ON/OFF of the switch 311 under control of a switch control signal. That is, the switch 311 is in the OFF state when overwrite is not performed while it is in the ON state when overwrite is performed. The switch control signal is the reproduced shape signal Rk indicating whether the data of the reproduced block output from the adder 310 is data of an effective block or not.

In this third embodiment, when coding an image signal corresponding to each frame, an initial value is written in the frame memory 313 and, thereafter, only the data of the effective blocks including at least one significant sample amongst the reproduced blocks are overwritten in the initialized frame memory 313. Therefore, it is not necessary to perform padding for not only the boundary blocks but also the ineffective blocks, whereby padding in the decoding process for reproduction is dispensed with.

While in this third embodiment a fixed value "127" is used as an initial value to be written in the frame memory 313 in the initialization step, the initial value is not restricted to "128".

Further, while in this third embodiment the texture coding unit 300 uses a fixed initial value as described above, it may use, as an initial value, the average of significant sample values in a frame which has already been reproduced.

Furthermore, the texture coding unit 300 may decide an initial value (only a luminance signal or both of luminance and chrominance signals) for each frame by a predetermined method, and encode the initial value of each frame by the variable-length encoder 311 to send it to the receiving end.

Embodiment 4

Figure 5:
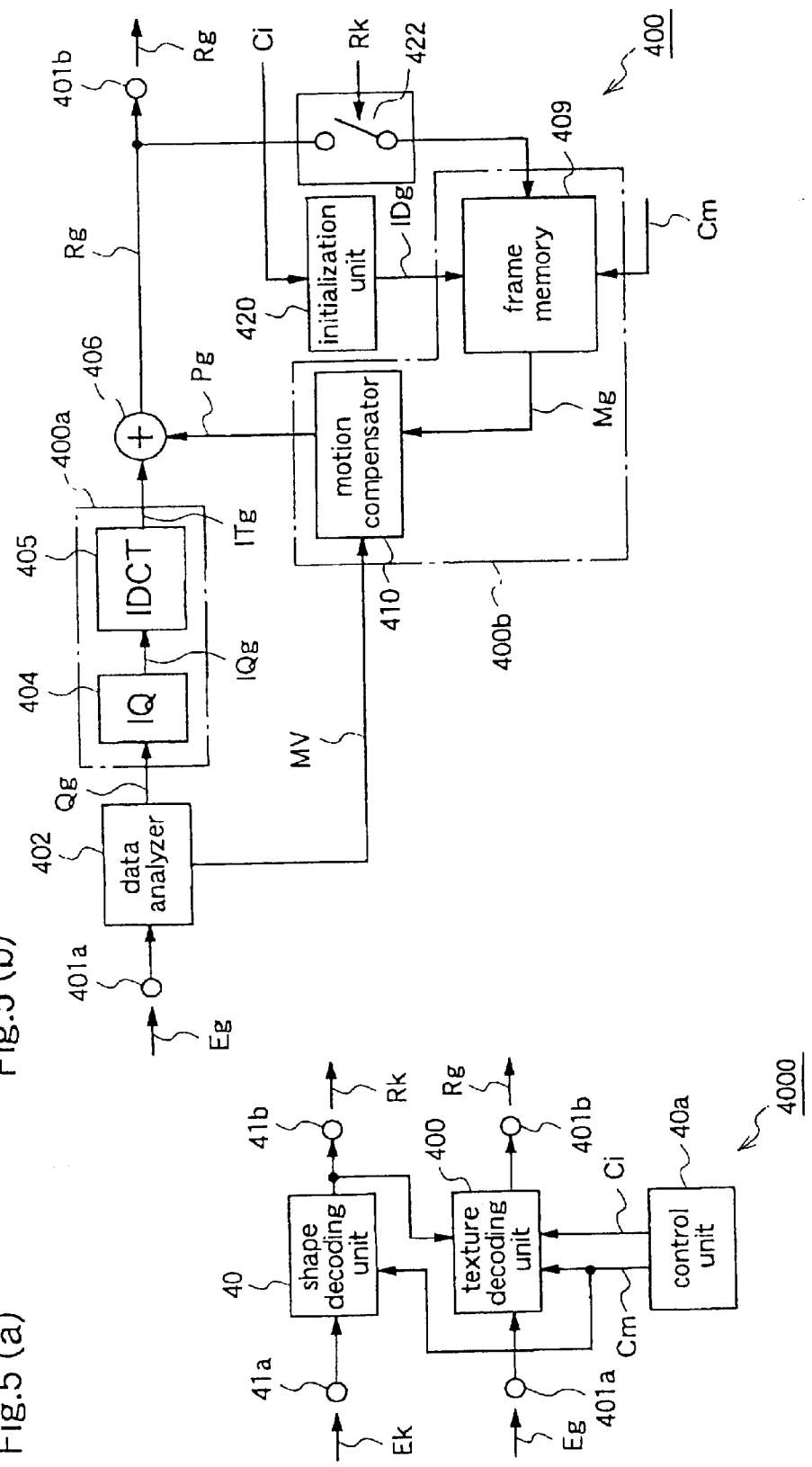

FIGS. 5(a) and 5(b) are block diagrams for explaining an arbitrary shape decoding apparatus as an image processing apparatus according to a fourth embodiment of the present invention, wherein FIG. 5(a) shows the entire structure of the apparatus and FIG. 5(b) shows the structure of a texture decoding unit as a component of the apparatus.

An arbitrary shape decoding apparatus (image decoding apparatus) 4000 of this fourth embodiment receives a coded shape signal Ek and a coded texture signal Eg corresponding to each frame, which are output from the arbitrary shape coding apparatus 3000 of the third embodiment, and decodes these signals for each of plural blocks into which an object region is divided.

The arbitrary shape decoding apparatus 4000 includes a shape decoding unit 40, a texture decoding unit 400, and a control unit 40a, like the arbitrary shape decoding apparatus 2000 of the second embodiment. The shape decoding unit 40 receives the coded shape signal Ek at an input terminal 41a, and performs data analysis and arithmetic decoding on the coded shape signal Ek frame by frame to output a reproduced shape signal Rk to an output terminal 41b. The texture decoding unit 400 receives the coded texture signal Eg at an input terminal 401a, and performs data analysis and data decompression on the coded texture signal Eg frame by frame to output a reproduced texture signal Rg to an output terminal 401b. The control unit 40a controls the decoding processes in the decoding units 40 and 400.

The shape decoding unit 40 and the control unit 40a are identical to the shape decoding unit 20 and the control unit 20a of the second embodiment, respectively. The texture decoding unit 400 is different from the texture decoding unit 200 of the second embodiment only in that it includes a switch 422 and an initialization unit 420 instead of the padding unit 208 of the second embodiment. The switch 422 controls supply of data Rg of a reproduction block to the frame memory 409 in accordance with a reproduced shape signal Rk from the shape decoding unit 40, and the initialization unit 420 initializes reference image data for a frame which has previously been processed and stored in the frame memory 409, in accordance with an initialization control signal Ci from the control unit 40a.

Other components of the texture decoding unit 400, i.e., a data analyzer 402, a data decompressor 400a, an adder 406, and a prediction signal generation unit 400b, are identical to the corresponding components 202, 200a, 206, and 206b of the texture decoding unit 200 according to the second embodiment. Further, an inverse quantizer 404 and an inverse DCT unit 405 constituting the data decompressor 400a are identical to the inverse quantizer 204 and the inverse DCT unit 205 constituting the data decompressor 200a of the second embodiment, respectively. Further, a motion compensator 410 and a frame memory 409 constituting the prediction signal generation unit 400b are identical to the motion compensator 210 and the frame memory 209 constituting the prediction signal generation unit 200b of the second embodiment, respectively.

Next, a description is given of the operation.

The fundamental operation of the arbitrary shape decoding apparatus 4000 of this fourth embodiment is identical to that of the arbitrary shape decoding apparatus 2000 of the second embodiment. So, only what differs from the second embodiment will be described hereinafter.

In this fourth embodiment, when decoding a coded image signal Eg of one frame corresponding to an arbitrarily shaped image (object), the initialization unit 420 performs initialization of the frame memory 409 at a timing according to the initialization control signal Ci from the control unit 40a. For example, initialization of the frame memory 313 is performed at the timing when decoding of a coded image signal corresponding to one frame has ended. Further, a predetermined pixel value "128" is employed as pixel values to be written in the frame memory by the initialization as a luminance signal and a chrominance signal of one frame.

Next, amongst the data Rg of the reproduced blocks from the adder 406, only the data of the effective blocks including at least one significant sample are overwritten in the initialized frame memory 409. The overwrite in the frame memory 409 is controlled by ON/OFF of the switch 422 under control of a switch control signal. That is, the switch 422 is in the OFF state when overwrite is not performed while it is in the ON state when overwrite is performed. The switch control signal is the reproduced shape signal Rk indicating whether the data of the reproduced block output from the adder 406 is data of an effective block or not.

In this fourth embodiment, the frame memory 409 is initialized with a predetermined value and, thereafter, only the data of the effective blocks including at least one significant sample amongst the reproduced blocks are overwritten in the initialized frame memory 409. Therefore, it is not necessary to perform padding for not only the boundary blocks but also the ineffective blocks, whereby padding for the data of the reproduced blocks is dispensed with.

While in this fourth embodiment a fixed value "128" is used as an initial value to be written in the frame memory 409 in the initialization step, the initial value is not restricted to "128".

Further, while in this fourth embodiment the texture decoding unit 400 uses a fixed initial value as described above, it may use, as an initial value, the average of significant sample values in a frame which has already been reproduced.

Furthermore, the texture decoding unit 400 may extract an initial value for each frame (only a luminance signal or both of luminance and chrominance signals) included in the coded image signal to change the initial value for each frame.

Embodiment 5

Figure 6:
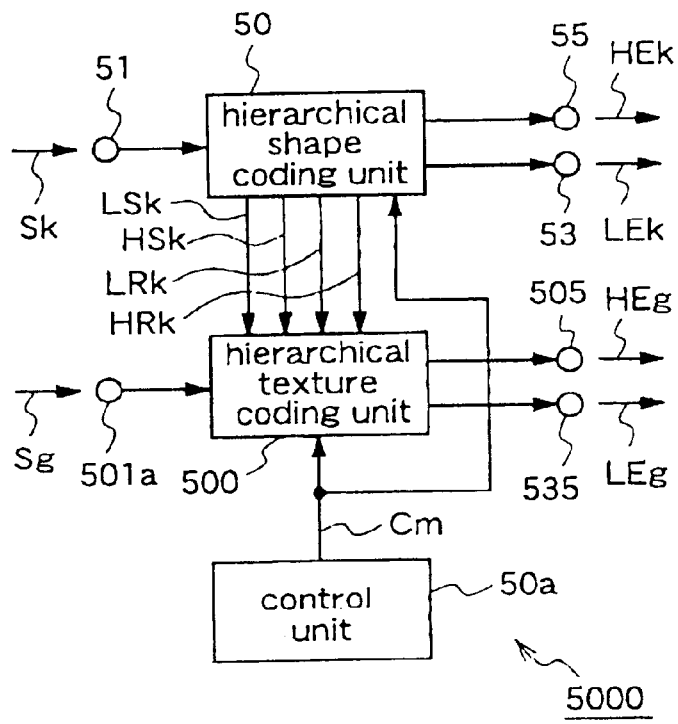
FIGS. 6(a) and 6(b) are block diagrams illustrating the schematic structures of an image coding apparatus according to a fifth embodiment of the invention, and an image decoding apparatus according to a sixth embodiment of the invention, respectively.
Figure 6:
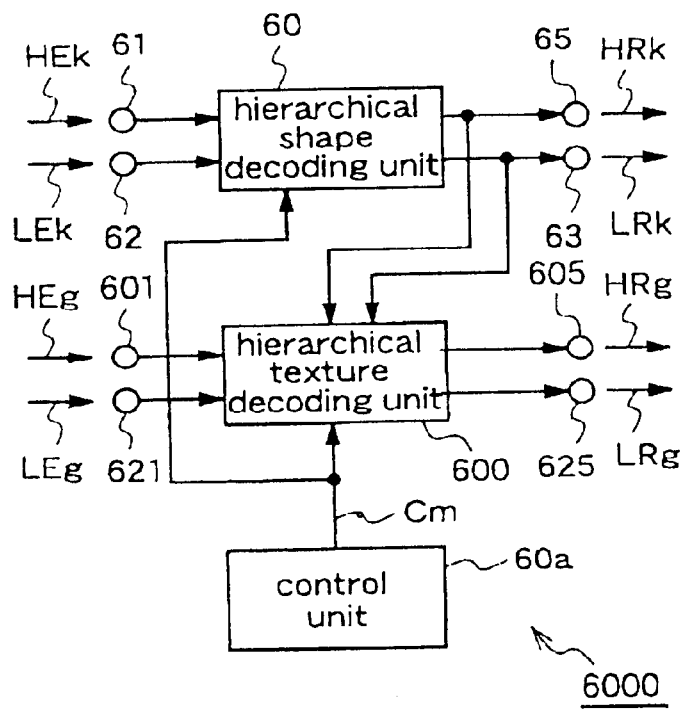
Figure 7:
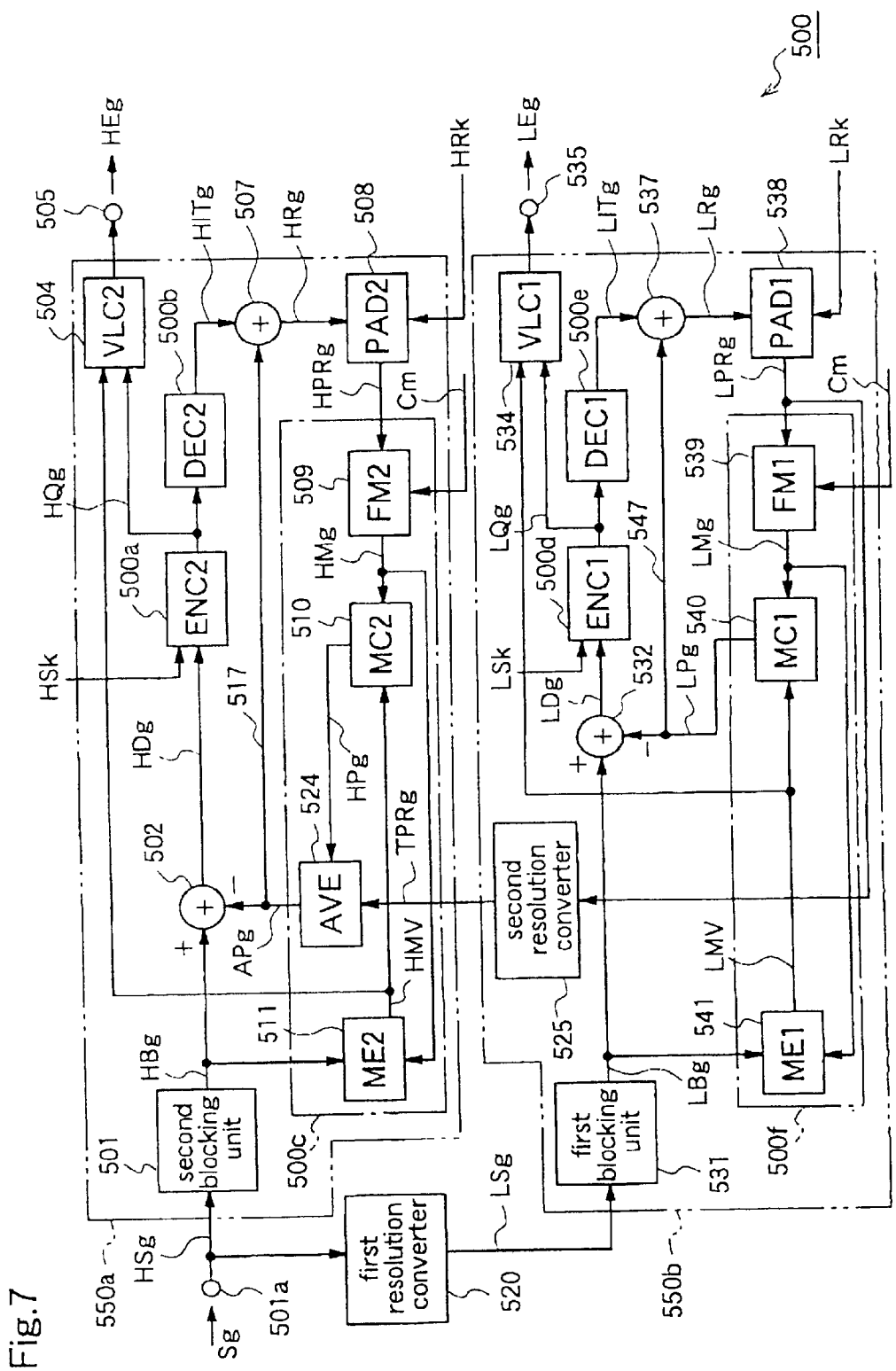
FIG. 7 is a block diagram illustrating the structure of a texture coding unit as a component of the image coding apparatus according to the fifth embodiment.

FIGS. 6(a) and 7 are block diagrams for explaining a hierarchical arbitrary shape coding apparatus as an image processing apparatus according to a fifth embodiment of the present invention. FIG. 6(a) shows the entire structure of the apparatus and FIG. 7 shows the structure of a hierarchical texture coding unit as a component of the apparatus.

An image coding apparatus (hierarchical arbitrary shape coding apparatus) 5000 of this fifth embodiment receives a digital image signal (arbitrarily shaped image signal) of each frame corresponding to an object (arbitrarily shaped image) as a component of a display image, and performs hierarchical coding on the digital image signal for each of plural blocks into which a region including the object (object region) is divided.

The image coding apparatus 5000 includes a hierarchical shape coding unit 50, a hierarchical texture coding unit 500, and a control unit 50a. The hierarchical shape coding unit 50 receives, at an input terminal 51a, a shape signal Sk which is included in the above-described digital image signal and indicates the shape of an object, and performs arithmetic coding and variable-length coding hierarchically on the shape signal Sk for each frame to output a coded high-resolution shape signal HEk and a coded low-resolution shape signal LEk toward an output terminal 55 and an output terminal 53, respectively. The hierarchical texture coding unit 500 receives, at an input terminal 501a, a texture signal Sg (a luminance signal and a chrominance signal) included in the digital image signal and indicating the gradation in color of the object, and performs data compression and variable-length coding hierarchically on the texture signal Sg for each frame to output a coded high-resolution texture signal HEg and a coded low-resolution texture signal LEg toward an output terminal 505 and an output terminal 535, respectively. The control unit 50a controls the coding process of each coding unit.

The hierarchical texture coding unit 500 includes a high-resolution coding unit 550a, a first resolution converter 520, and a low-resolution coding unit 550b. The high-resolution coding unit 550a performs data compression and variable-length coding on a high-resolution texture signal HSg (the above-described texture signal Sg) to generate a coded high-resolution signal HEg. The first resolution converter 520 down-samples the texture signal Sg to generate a low-resolution texture signal LSg. The low-resolution coding unit 550b performs data compression and variable-length coding on the low-resolution texture signal LSg to generate a coded low-resolution signal LEg.

The low-resolution coding unit 550b includes a first blocking unit 531, a prediction signal generation unit 550f, a first adder 532, a first data compressor (ENC1) 500d, and a first variable-length coder (VLC1) 534. The blocking unit 531 divides the low-resolution texture signal LSg into plural blocks. The prediction signal generation unit 500f generates data LPg of a prediction block for a target block in a frame which is presently processed (present frame). The first adder 532 obtains difference data between the data LBg of the target block and the data LPg of the prediction block as data LDg of a residual block. The first data compressor (ENC1) 500d compresses the data LDg of the residual block to output data LQg of the compressed residual block. The first variable-length coder 534 performs variable-length coding on the data LQg of the compressed residual block to output a coded low-resolution signal LEg. The first data compressor 500d comprises a residual padding unit, a DCT unit, and a quantizer, like the data compressor 100a of the first embodiment. The residual padding unit performs padding on the residual block in accordance with the low-resolution shape signal LSk from the hierarchical shape coding unit 50.

Further, the low-resolution coding unit 550b includes a first data decompressor (DEC1) 500e, a second adder 537, and a first reproduced data padding unit (PAD1) 538. The first data decompressor 500e decompresses the data LQg of the compressed residual block to output data LITg of a decompressed residual block. The second adder 537 adds the data LITg of the decompressed residual block to the data LPg of the prediction block and outputs data LRg of a reproduced block. The first reproduced data padding unit 538 performs padding on the data LRg of the reproduced block in accordance with a reproduced low-resolution shape signal LRk from the hierarchical shape coding unit 50 and outputs padded data LPRg of the reproduced block to the prediction signal generation unit 500f. The first data decompressor 500e is identical to that of the first embodiment.

Further, the low-resolution coding unit 550b includes a second resolution converter 525 which converts the resolution of the padded data LPRg of the reproduced block by un-sampling to generate resolution-converted image data TPRg whose resolution is equal to the resolution of the high-resolution texture signal HSg.

The prediction signal generation unit 500f included in the low-resolution coding unit 550b comprises a first motion detector (ME1) 541, a first motion compensator (MC1) 540, and a first frame memory (FM1) 539 which are identical to the motion detector 114, the motion compensator 115, and the frame memory 113 constituting the prediction signal generation unit 100c of the first embodiment, respectively.

On the other hand, the high-resolution coding unit 550a includes a second blocking unit 501, a prediction signal generation unit 500c, a third adder 502, a second data compressor (ENC2) 500a, and a second variable-length coder (VLC2) 504. The blocking unit 501 divides the high-resolution texture signal HSg into plural blocks. The prediction signal generation unit 500c generates data APg of a prediction block for a target block in a frame which is presently processed (present frame). The third adder 502 obtains difference data between the data HBg of the target block and the data APg of the prediction block as data HDg of a residual block. The second data compressor (ENC1) 500a compresses the data HDg of the residual block to output data HQg of the compressed residual block. The second variable-length coder 504 performs variable-length coding on the data HQg of the compressed residual block to output a coded high-resolution signal HEg. The second data compressor 500a comprises a residual padding unit, a DCT unit, and a quantizer, like the data compressor 100a of the first embodiment. The residual padding unit perform padding on the residual block in accordance with the high-resolution shape signal HSk from the hierarchical shape coding unit 50.

Further, the high-resolution coding unit 550a includes a second data decompressor (DEC2) 500b, a fourth adder 507, and a second reproduced data padding unit (PAD2) 508. The second data decompressor 500b decompresses the data HQg of the compressed residual block to output data HITg of a decompressed residual block. The fourth adder 507 adds the data HITg of the decompressed residual block to the data APg of the prediction block and outputs data HRg of a reproduced block. The second reproduced data padding unit 508 performs padding on the data HRg of the reproduced block in accordance with a reproduced high-resolution shape signal HRk from the hierarchical shape coding unit 50 and outputs padded data HPRg of the reproduced block to the prediction signal generation unit 500c. The second data decompressor 500b is identical to that of the first embodiment.

The prediction signal generation unit 500c comprises a second motion detector (ME2) 511, a second motion compensator (MC2) 510, and a first frame memory (FM2) 509 which are identical to the motion detector 114, the motion compensator 115, and the frame memory 113 constituting the prediction signal generation unit 100c of the first embodiment, respectively. Further, the prediction signal generation unit 500c includes a weight averaging unit (AVE) 524 which performs weighted averaging on the resolution-converted image data TPRg from the second resolution converter 525 and the data HPg of the prediction block from the second motion compensator 510, and outputs weighted average data APg of the prediction block.

Although only the structure of the hierarchical texture coding unit 500 has been described in detail, the hierarchical shape coding unit 50 is similar to the hierarchical texture coding unit 500. To be specific, the hierarchical shape coding unit 50 does not have reproduced data padding units like the first and second reproduced data padding units 538 and 508 possessed by the hierarchical texture coding unit 500. Further, the hierarchical shape coding unit 50 includes high-resolution side and low-resolution side arithmetic encoders which perform compressive coding on high-resolution and low-resolution shape signals of each block by a method of quad-tree, instead of the high-resolution side and low-resolution side data compressors 500a and 500b which perform padding, DCT, and quantization on the high-resolution and low-resolution texture signals. Further, it includes high-resolution and low-resolution side arithmetic decoders which are adapted to the arithmetic encoders, instead of the high-resolution side and low-resolution side data decompressors 500b and 500e which perform inverse quantization and inverse DCT.

A description is now given of the operation.

When a digital image signal for displaying a predetermined object as a component of a display image is input to the hierarchical arbitrary shape coding apparatus 5000, a shape signal Sk and a texture signal Sg included in the digital image signal are subjected to hierarchical coding, frame by frame, in the hierarchical shape coding unit 50 and the hierarchical texture coding unit 500, respectively.

To be specific, in the texture coding unit 500, when the texture signal Sg is input to the input terminal 501a, this texture signal Sg is converted to a low-resolution texture signal LSg by down-sampling in the first resolution converter 520.

Generally, in down-sampling for an input image signal, predetermined pixels are sampled from an image space (one frame) comprising K×L samples (pixels) and corresponding to the input image signal, thereby generating a sampled image space comprising K/2×L/2 pixels. In this fifth embodiment, high frequency components of the texture signal Sg are removed by using a low-pass filter and, thereafter, every other sample values are extracted from sample values constituting the texture signal Sg, thereby generating a low-resolution texture signal LSg forming a sampled image space. Such down-sampling is also performed on the shape signal Sk in the hierarchical shape coding unit 50. Although the down-sampling is performed at the ratio of ½, it may be performed at a ratio other than ½.

Next, the low-resolution texture signal LSg is input to the low-resolution coding unit 550b, and the texture signal Sg which has not been sampled is input to the high-resolution coding unit 550a as a high-resolution texture signal HSg.

In the low-resolution coding unit 550b, the low-resolution texture signal LSg is input to the first blocking unit 531, wherein it is divided into texture signals corresponding to plural blocks into which a region including an object (object region) is divided. The divided texture signals are output as image data LBg of the respective blocks. Each block is a region comprising 8×8 pixels.

Subsequently, the image data LBg of a target block to be coded in a frame which is presently processed (present frame) is input to the first motion detector (ME1) 541. At this time, a previously reproduced image LMg (an image of a previous frame which has already been coded) stored as reference image data in the first frame memory (FM1) 539 is also input to the first motion detector 541. In the first motion detector 541, displacement information which gives a prediction block having image data of the smallest error from the data LBg of the target block, is obtained according to the reference image data LMg, and this displacement information is output as a first motion vector LMV to the first motion compensator 540.

On receipt of the first motion vector LMV, the first motion compensator 540 generates data LPg of the prediction block for the target block from the reference image data LMg. Then, the motion vector LMV is sent to the first variable-length coder (VLC1) 534, and converted to a variable-length code to be output.

The data LBg of the target block and the data LPg of the prediction block are input to the first adder 532, and difference data between these image data is obtained as data LDg of a residual block. The data LDg of the residual block is input to the first data compressor 500d, wherein it is subjected to padding using the coded low-resolution shape signal LSk, DCT, and quantization, to be output as data LQg of a compressed residual block. The data LQg of the compressed residual block is converted to variable-length codes in the first variable-length coder 534, and the variable-length codes are output as a coded low-resolution signal LEg from the output terminal 535 together with coded data of side information including the motion vector LMV.

At this time, the data LQg of the compressed residual block is input to the data decompressor 500e, wherein it is restored to data LITg of a decompressed residual block by data decompression similar to that of the data decompressor 100b of the first embodiment. Further, in the first adder 537, the data LITg of the decompressed residual block is added to the data LPg of the prediction block, and the result of the addition is supplied to the first reproduced data padding unit 538 as data LRg of a reproduced block.

In the first reproduced data padding unit 538, amongst the data of the sequentially input reproduced blocks, only the data of ineffective blocks comprising only insignificant samples are subjected to padding, thereby defining the sample values of the ineffective blocks. On the other hand, no padding is performed on data of effective reproduced blocks including the boundary blocks. At this time, in the reproduced data padding unit 538, it is decided whether each reproduced block is an ineffective block or an effective block, based on the reproduced low-resolution shape signal LRk from the hierarchical shape coding unit 50. Further, in this fifth embodiment, the pixel values of the respective pixels constituting the ineffective block, i.e., the values of the luminance components and chrominance components, are replaced with a predetermined padding value "128".

The padding value used for the replacement may be changed for each frame. In this case, the padding value of each frame (only the value of the luminance signal, or both of the values of the luminance and chrominance signals) must be coded by the variable-length coder 535 to be sent to the receiving end. Further, the padding process for the ineffective block may be to repeat the process of replacing the significant sample values of an effective block adjacent to the ineffective block with insignificant sample values.

The padded data LPRg of the reproduced block from the first reproduced data padding unit 538 is stored in the first frame memory 539 as reference image data for a frame to be processed next. On the other hand, the padded data LPRg of the reproduced block is supplied to the second resolution converter 525. In the resolution converter 525, the padded data LPRg is converted, by up-sampling, to data whose resolution is equal to the resolution of the high-resolution texture signal HSg, to be output as resolution converted data TPRg.

On the other hand, in the high-resolution coding unit 550a, the high-resolution texture signal HSg is subjected to hierarchical coding similar to that for the low-resolution texture signal LSg. This coding process for the high-resolution texture signal HSg is identical to that for the low-resolution texture signal LSg except the process of generating data of a prediction block for a target block in the present frame.

To be specific, the process of generating data of a prediction block employs, as a space prediction signal, the padded data LPRg of the reproduced block generated by the low-resolution coding unit 550b, in addition to the time prediction signal HPg obtained by motion compensation based on the second motion vector HMV in the second motion compensator 510 (i.e., data of the prediction block generated by the high-resolution coding unit 550a).

The padded data of the reproduced block as the space prediction signal LPRg is generated based on the low-resolution texture signal LSg which is obtained by down-sampling the texture signal Sq. So, in order to perform arithmetic operation between the space prediction signal LPRg and the time prediction signal HPg, the space prediction signal must be up-sampled by interpolation of pixels. Accordingly, in the second resolution converter 525 shown in FIG. 7, interpolation is performed on the padded data (space prediction signal) LPRg of the reproduced block output from the first reproduced data padding unit 538. In this converter 525, interpolation values are generated by using a filter having even number of taps, and pixels constituting the space prediction signal are interpolated with these values.

The resolution-converted data TPRg, which has been obtained by up-sampling the padded data (space prediction data) of the reproduced block generated by the low-resolution coding unit 550b, is input to the weighted averaging unit 524 together with the time prediction signal HPg. In the weighted averaging unit 524, the time prediction signal HPg and the resolution-converted data TPRg are subjected to weighted averaging to be converted to weighted average prediction data APg, and this data APg is input to the third and fourth adders 502 and 507.

In this fifth embodiment, as a weight ratio of the time prediction signal to the space prediction signal, one of 1:0, 0:1, and ½:½ is selected for each frame. However, the weight ratio is not restricted to these.

In this fifth embodiment, as described above, the weighted average prediction data obtained by weighted averaging between the time prediction signal and the resolution-converted data in the weighted averaging unit 524 is supplied to the third adder 502 in the high-resolution coding unit 550a, as the data APg of the prediction block for the target block. However, a selector switch which selects either the time prediction signal of the resolution-converted data may be provided in place of the weighted averaging unit 524, and the output of this selector switch may be supplied to the third adder.

Further, while in this fifth embodiment the output LPRg of the first padding unit 538 is used as a space prediction signal, the data LMg stored in the frame memory to be output to the first padding unit 540 may be used as a space prediction signal.

Figure 8:
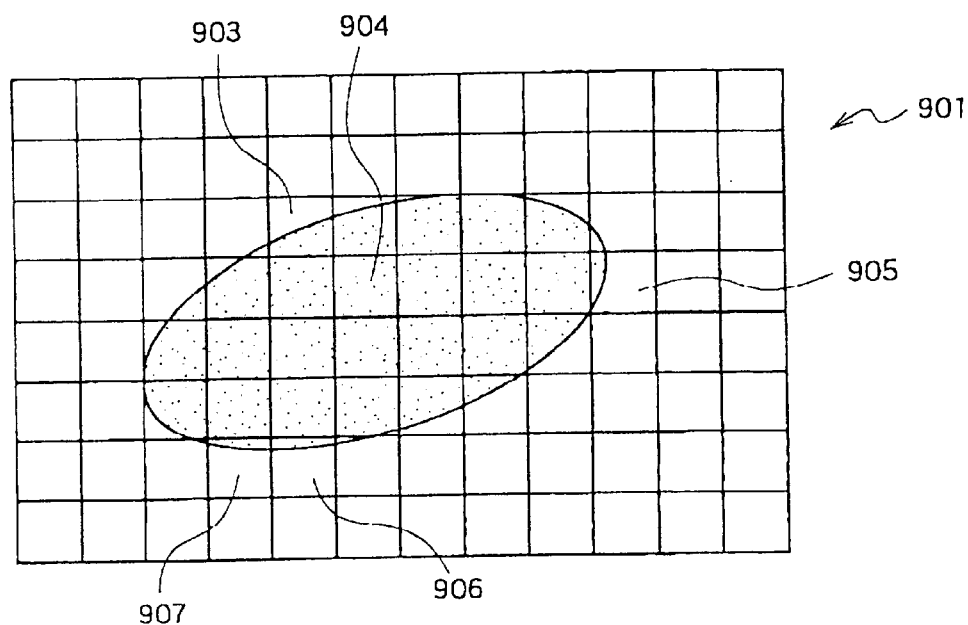
FIGS. 8(a) and 8(b) are diagrams for explaining the process of generating data of a prediction block for a target block, in the apparatuses according to the fifth and sixth embodiments.
Figure 8:
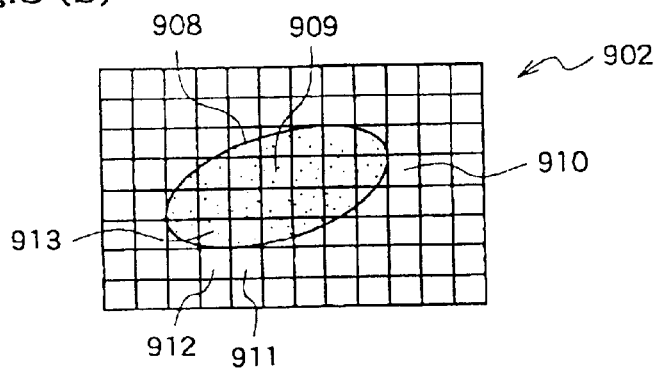

FIGS. 8(a) and (b) are schematic diagrams for explaining the process of generating resolution-converted data TPRg to be used in the high-resolution coding unit 550a, from the padded data LPRg of the reproduced block generated in the low-resolution coding unit 550b.

In these figures, 901 denotes an image space formed by data HBg of a high-resolution target block (high-resolution object region), and 902 denotes an image space formed by padded data LPRg of a reproduced low-resolution block. In each of the image spaces 901 and 902, a dotted region is an inside region of an object (inside-object region), and this inside-object region is composed of significant pixels. A region other than the inside-object region (dotted region) is a region outside the object (outside-object region), and this region is composed of insignificant pixels.

Each of the image spaces 901 and 902 is composed of plural blocks arranged in matrix (12 blocks in the horizontal direction×8 blocks in the vertical direction). The respective blocks composing the low-resolution image space 902 are space prediction blocks corresponding to the target blocks to be coded (hereinafter referred to simply as "target blocks") composing the high-resolution image space 901, and each target block and the corresponding space prediction block are located in the same position in the respective image spaces. For example, the target block 904 and the corresponding space prediction block 909 are located in the position in the 6th column from the left and the 4th row from the top, in the image space 901 and the image space 902, respectively.

When comparing the target blocks 905, 906, and 907 in the image space 901 with the corresponding space prediction blocks 910, 911, and 912, the target blocks 905, 906, and 907 are positioned on the boundary of the object while the corresponding space prediction blocks 901, 911, and 912 are positioned outside the object.

The reason is as follows. Since the data LRg of the reproduced low-resolution blocks are generated by performing down-sampling and compressive coding on the high-resolution texture signal HSg (input image signal), the shape of the object on the image space composed of the data of the reproduced low-resolution blocks is deformed.

In this case, for example, the space prediction block 912 corresponding to the target block 907 is an ineffective block comprising undefined pixels. If the data of the space prediction block 912 is used as it is for the prediction process in the high-resolution coding unit 550a, the data of the residual block, i.e., a difference between the target block's data and the prediction block's data, becomes large.

So, in this fifth embodiment, only the space prediction blocks comprising undefined pixels are subjected to padding in the first padding unit 538. To be specific, the pixels of the ineffective blocks (i.e., blocks comprising insignificant pixels only) are replaced with padding pixels having a predetermined pixel value. The padding value may be a sample value of a significant pixel of an adjacent block.

Since padding is performed on only the ineffective blocks comprising insignificant samples amongst the reproduced low-resolution blocks, even when the space prediction blocks in the low-resolution image space are positioned outside the object, the sample values of the space prediction blocks are replaced with a predetermined sample value or sample values of the inside-object pixels, thereby suppressing a prediction error signal which is a difference between the data of the high-resolution target block and the low resolution obtained by converting the resolution of the data of the space prediction block.

While in this fifth embodiment the image coding unit 500 generates the low-resolution texture signal by spatial down-sampling of the input texture signal (high-resolution texture signal), the low-resolution texture signal may be generated by temporal down-sampling of the input texture signal.

For example, texture signals corresponding to frames F(0), F(N), F(2N), . . . at times t, T+H·Tf, t+2N·Tf, . . . are input as low-resolution texture signals to the low-resolution coding unit 550b in the texture coding unit 500 shown in FIG. 7, while texture signals corresponding to frames positioned between the above-mentioned frames, i.e., frames F(1)~F(N−1), F(N+1)~F(2N−1), F(2N+1)~, are input as high-resolution texture signals to the high-resolution coding unit 550a in the texture coding unit 500. the outputs HEg and LEg of the coding units 550a and 550b are output as coded high-resolution texture signals while the output LEg of the coding unit 550b is output as a coded low-resolution texture signal.

Here, Tf is the frame cycle, and N is an arbitrary integer. A practical value of N is 3.

Hereinafter, a coding unit which performs hierarchical coding using a low-resolution texture signal obtained by temporal down-sampling as described above will be described as a modification of the fifth embodiment. The coding apparatus of this modification is obtained by altering the structure of the texture coding unit 500 of the fifth embodiment.

The hierarchical coding unit of this modification employs a temporal down-sampling unit instead of the first resolution converter 520 included in the texture coding unit 500 of the fifth embodiment. The temporal down-sampling unit separates the input texture signals corresponding to the respective frames into two groups, i.e., the texture signals corresponding to the frames other than these frames. Further, the hierarchical coding unit employs a temporal up-sampling unit instead of the second resolution converter (spatial up-sampling unit) 525 performing interpolation by up-sampling. The temporal up-sampling unit performs motion compensation (i.e., data of prediction blocks in the frames positioned between the frames F(0), F(N), F(2N), . . . at times t, T+N·Tf, T+2N·Tf, . . . ) are accessed as resolution-converted data from the first frame memory 539 by using the low-resolution side motion vector LMV.

In the up-sampling unit, scaling is performed on the low-resolution side motion vector LMV to generate a motion vector (scaling motion vector) for a target block to be processed in the present frame which is presently processed in the high-resolution coding unit 550a. Based on the scaling motion vector, data of a prediction block for the target block in the present frame on the high-resolution side is generated from the data stored in the frame memory 539 in the low-resolution coding unit 550b, and this data is output as resolution-converted data TPRg to the weighted averaging unit 524.

While the data of the prediction block for the high-resolution side target block is generated in the low-resolution coding unit 550b, in the high resolution coding unit 550a the data HPg of the prediction block for the high-resolution side target block is generated by the motion compensator 510 according to the high resolution side motion vector HMV, and this data is output to the weighted averaging unit 524.

In the weighted averaging unit 524, the data HPg of the prediction block generated in the high-resolution coding unit 550b) are converted to weighted average prediction data APg by weighted averaging. The weighted average prediction data APg is input to the third and fourth adders 502 and 507.

Hereinafter, coding of texture signals corresponding to sequential frames F(0), F(1), F(2), F(3), F(4), F(5), and F(6) will be described in detail.

The texture signals corresponding to the frames F(0)~F(6) are separated by the temporal down-sampling unit, and the texture signals corresponding to the frames F(0), F(3), and F(6) are input to the low-resolution coding unit 550b while the texture signals corresponding to the frames F(1), F(2), F(4), and F(5) are input to the high-resolution coding unit 550a.

At this time, in the low-resolution coding unit 550b, for example, data of a prediction block for a target block in the present frame F(2) on the high-resolution side is generated as follows.

Since the texture signal corresponding to the frame F(2) is not input to the low-resolution coding unit 550b, motion vectors of the respective blocks in the frame F(2) are not generated. Therefore, in the low-resolution coding unit 550b, the motion vector LMV of a block in the frame F(3) corresponding to the target block in the frame F(2) is subjected to scaling by the temporal up-sampling unit, whereby a scaling motion vector corresponding to the target block in the frame F(2) is generated.

In this case, since the reference frame for the frame F(3) is the frame F(0) and two frames (i.e., frames F(3), the motion vector LMV in the frame F(3) is increased by ⅔ times in the scaling process, resulting in a motion vector (scaling motion vector) corresponding to the target block in the frame F(2).

Further in the temporarl up-sampling unit, data TPRg of a prediction block for the target block in frame F(2) is generated according to the scaling motion vector by using the frame F(0) as a reference frame.

On the other hand, in the high-resolution coding unit 550a, data HMg of a prediction block is generated by the motion compensator 510, based on the motion vector HMV of the target block in the frame F(2), which is obtained by motion detection using the frame F(1) as a reference frame.

In the weighted averaging unit 524, the prediction block data HPg generated in the high-resolution coding unit 550a and the resolution-converted data TPRg (the data of the prediction block generated in the low-resolution coding unit 550b) are subjected to weighted averaging to generate weighted average prediction data APg for the target block in the frame F(2).

In the hierarchical coding process using a low-resolution texture signal obtained by temporarl down-sampling, the following prediction may be performed, instead of the above-described process of generating data of a prediction block for the high-resolution side target block from the low-resolution texture signal by using a motion vector (scaling motion vector) obtained by scaling the low-resolution side motion vector.

That is, in this prediction process, motion detection for the target block in the present frame on the high-resolution side is performed directly by using the texture signal of the reference frame on the low-resolution side and, further, motion compensation is performed based on the motion vector so obtained, by using the reference frame on the low-resolution side, whereby data of a prediction block for the high-resolution side target block can be obtained.

Hereinafter, a description will be given of the process of generating data of a prediction block for a target block in the present frame F(2) on the high-resolution side from the texture signal of the reference frame F(0) on the low-resolution side.

In this case, the temporal up-sampling unit is not required, and the motion detector 511 can read the texture signals stored in the frame memory 539 of the low-resolution coding unit 550b. The motion detector 511 generates a motion vector of the target block by comparing the texture signal of the target block in the present frame F(2) with the texture signal of the reference frame F(1) stored in the high-resolution side frame memory 509 and, moreover, it generates an additional motion vector of the target block by comparing the texture signal of the target block in the present frame F(2) with the texture signal of the reference frame F(0) stored in the low-resolution side frame memory 539.

In the motion compensator 540 in the low-resolution coding unit 550b, data of the prediction block for the target block in the present frame F(2) is generated from the data of the reference frame F(0) stored in frame memory 539, according to the additional motion vector.

Further, in the low-resolution (high-resolution) coding unit 550b (550a) according to the fifth embodiment, padding for the data of the reproduced low-resolution (high-resolution) block is performed by using the first (second) padding unit. However, the padding for the reproduced block in each coding unit may be performed by using an initialization unit for initializing the frame memory and a switch for controlling supply of the data of the reproduced block from the padding unit to the frame memory, like the third embodiment of the invention. In this case, the frame memory is initialized for each frame and, thereafter, only the data of the effective reproduced blocks including at least one significant sample are overwritten in the initialized frame memory.

Embodiment 6

Figure 9:
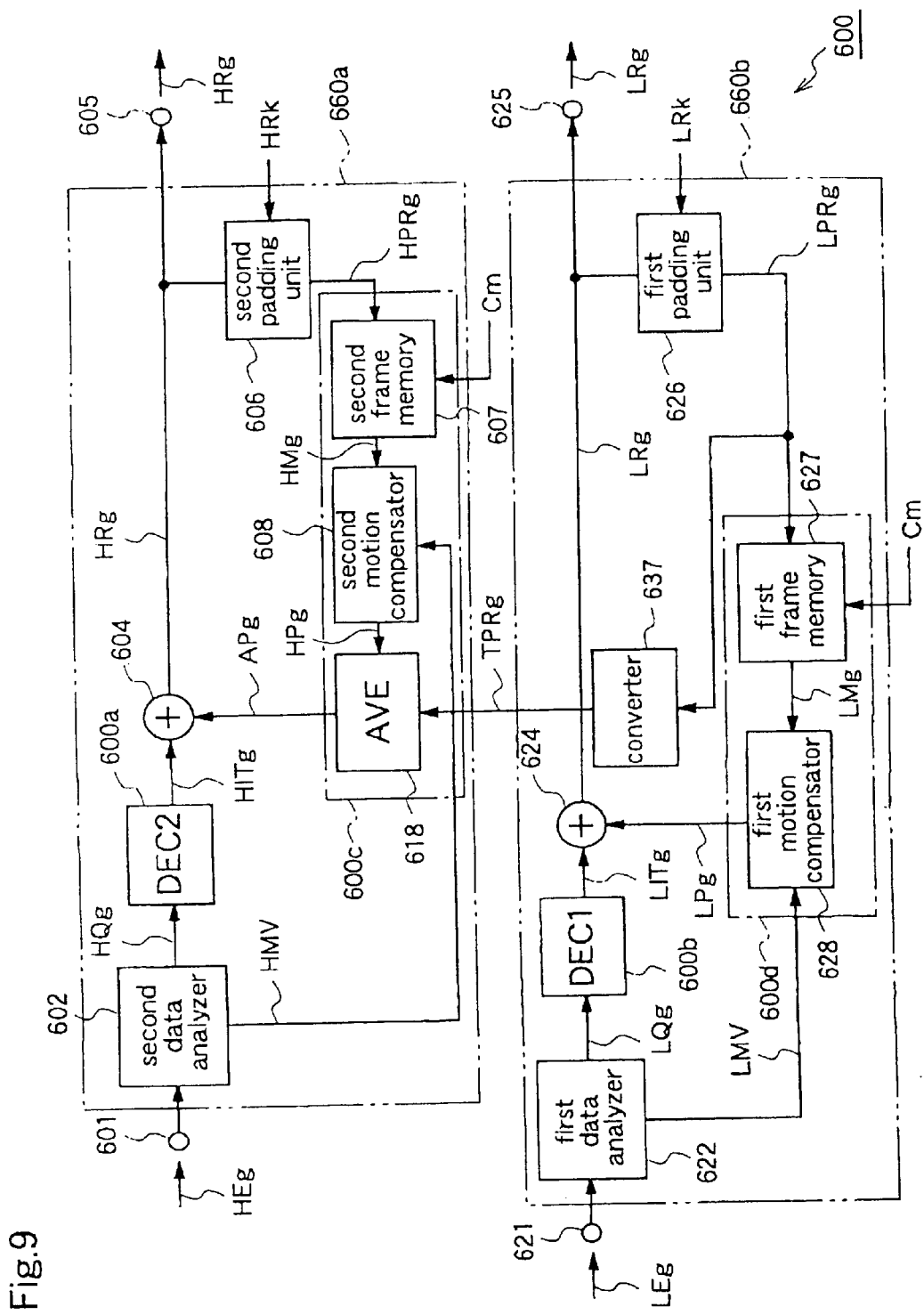
FIG. 9 is a block diagram illustrating the structure of a texture decoding unit as a component of the image decoding apparatus according to the sixth embodiment.

FIGS. 6(b) and 9 are block diagrams for explaining a hierarchical arbitrary shape decoding apparatus as an image processing apparatus according to a sixth embodiment of the invention, and FIG. 6(b) shows a hierarchical texture decoding unit as a component of the apparatus.

A hierarchical arbitrary shape decoding apparatus (image decoding apparatus) 6000 of this sixth embodiment received the coded high-resolution and low-resolution texture signals HEg and LEg and the coded high-resolution and low-resolution shape signals HEk and LEk which are output from the hierarchical arbitrary shape coding apparatus 5000, and performs hierarchical decoding on these signals for each of plural blocks into which a region including an object (Object region) is divided.

The hierarchical arbitrary shape decoding apparatus 6000 includes a hierarchical shape decoding unit 60, a hierarchical texture decoding unit 600, and a control unit 60a. The hierarchical shape decoding unit 60 performs data analysis and arithmetic decoding on the coded high-resolution and low-resolution shape signals HEk and LEk to output reproduced high-resolution and low-resolution shape signals HRk and LRk. The hierarchical texture coding unit 600 performs data analysis and data decompression on the coded high-resolution and low-resolution texture signals HEg and LEg to output reproduced high-resolution and low-resolution texture signals HRg and LRg. The control unit 60a control the process of each decoding unit.

The texture decoding unit 600 includes a high-resolution decoding unit 660a and a low-resolution decoding unit 660b. The high-resolution decoding unit 660a decodes the coded high-resolution signal HEg, and the low-resolution decoding unit 660b decodes the coded low-resolution signal LEg to generate the reproduced low-resolution signal LEg.

The low-resolution decoding unit 660b includes a first data analyzer 622, a first data decompressor (DEC1) 600b, and a first adder 624, like the image decoding unit 200 of the second embodiment. The data analyzer 622 analyzes the coded low-resolution signal LEg and performs variable-length decoding on the signal LEg. The data decompressor 600b decompresses the output LQg of the data analyzer 622 and outputs data LITg of the decompressed block in the present frame. The adder 624 adds the data LITg of the decompressed block to output data LRg of a prediction block for the decompressed block to output data LRg of a reproduced block. Further, the low-resolution decoding unit 660b includes a first padding unit 626, a first prediction signal generation unit 600d, and a resolution converter 637. The first padding unit 626 performs padding on the output LRg from the adder 624 in accordance with a reproduced low-resolution shape signal LRk from the hierarchical shape decoding unit 60. The first prediction signal generation unit 600d generates the data LPg of the prediction block. The resolution converter 637 converts the resolution of the output LPRg of the first padding unit 626 by up-sampling to generate resolution-converted data TPRg whose resolution is equal to the resolution of the high-resolution texture signal HSg.

The first prediction signal generation unit 600d includes a motion compensator 628 and a first frame memory 627 which are identical to the motion compensator 210 and the frame memory 209 of the prediction signal generation unit 200b of the second embodiment, respectively.

On the other hand, the high-resolution decoding unit 660a includes a second data analyzer 602, a second data decompressor (DEC2) 600a, and a second adder 604. The data analyzer 602 analyzes the coded high-resolution signal HEg and performs variable-length decoding on the signal HEg. The data decompressor 600a decompresses the output HQg of the data analyzer 602 and outputs data HITg of the decompressed block in the present frame. The adder 604 adds the data HITG of the decompressed block to weighted average prediction data TPRg of a prediction block for the decompressed block to output data HRg of a reproduced block. Further, the high-resolution decoding unit 660a includes a second padding unit 606 and a second prediction signal generation unit 600c. The second padding unit 606 performs padding on the data HRg from the second adder 604 in accordance with a reproduced high-resolution shape signal HRk from the hierarchical shape decoding unit 600c generates the data APg of the prediction block corresponding to the decompressed data of the present frame.

The second prediction signal generation unit 600c includes a second motion compensator 608 and a second frame memory 607 which are identical to the motion compensator 210 and the frame memory 209 of the prediction signal generation unit 200b of the second embodiment, respectively. Further, the second prediction signal generation unit 600c includes a weighted averaging unit 618 which performs weighted averaging on the resolution-converted data TPRg from the resolution converter 637 and the data of the prediction block from the second motion compensator 608, and outputs the weighted average prediction data APg to the second adder 604.

Although in this sixth embodiment only the structure of the hierarchical texture decoding unit 600 is described in detail, the hierarchical shape decoding unit 60 of the arbitrary shape decoding apparatus 6000 is similar to the hierarchical texture decoding unit 600. That is, the hierarchical shape decoding unit 60 is different from the hierarchical texture decoding unit 600 only in that it does not have first and second padding units 626 and 606, but has high-resolution side and low-resolution side arithmetic decoders performing decompressive decoding on the coded high-resolution side and low-resolution side data decompressors 600c and 600d which perform inverse DCT and inverse quantization.

A description will be given of the operation.

When the coded low-resolution and high-resolution shape signals LEk and HEk from the hierarchical arbitrary shape coding apparatus 5000 are input to the input terminals 62 and 61, respectively, these coded signals are subjected to hierarchical decoding in the hierarchical shape decoding unit 60, whereby reproduced low-resolution and high-resolution shape signals LRk and HRk are output to the output terminals 65 and 63, respectively.

Further, when the coded low-resolution signal LEg from the hierarchical arbitrary shape coding apparatus 5000 is input to the input terminal 621 of the low-resolution decoding unit 660b, it is analyzed and variable-length coded in the first data analyzer 622. The data LQG of the compressed residual block output from the data analyzer 622 is output to the data decompressor 600b while the motion vector LMV extracted in the data analyzer 622 is output to the first motion compensator 628. In the first data decompressor 600b, the data LQg of the compressed residual block is decompressed to restore the data of the residual block (described for the coding unit 550b) as data LITg of a decompressed residual block. In the first data decompressor 600b, as in the image decoding unit 200 of the second embodiment, the data LQg of the decompressed residual block is subjected to inverse DCT and inverse quantization.

In the first motion compensator 628, an address for making an access to the first frame memory 627 is generated in accordance with the motion vector LMV from the first data analyzer 622. Based on this address, data LPg of a low-resolution prediction block is generated from stored data LMg of a previously processed frame stored in the first frame memory 627.

The data LRg of the reproduced block is output to the first output terminal 625 as a reproduced low-resolution texture signal and, simultaneously, it is supplied to the first padding unit 626. In the padding unit 626, padding is performed on the ineffective reproduced blocks comprising only insignificant samples, amongst the reproduced blocks, whereby the pixel values of the respective pixels constituting the ineffective reproduced blocks are defined. Further, no padding is performed on the effective reproduced blocks including the boundary blocks.

Meanwhile, in the first padding unit 626, it is decided whether each reproduced block is an ineffective block or an effective block, based on the reproduced low-resolution shape signal LRk from the hierarchical shape decoding unit 60. In this sixth embodiment, the sample values of the luminance and chrominance components are replaced with a predetermined padding value "128".

The padding value used for the replacement may be changed for each frame. In this case, the padding value of each frame (only the value of the luminance signal, or both of the values of the luminance and chrominance signals) is included in the coded low-resolution signal LEg, and it is extracted by the first data analyzer 622 to be sent to the first padding unit 628.

Further, the padding process for the ineffective block may be to repeat the process of replacing the significant sample values of an effective block adjacent to the ineffective block with significant sample values.

The padded data LPRg of the reproduced low-resolution block is stored in the first frame memory 627 as reference image data for a frame to be processed next.

On the other hand, in the high-resolution decoding unit 660a, the coded high-resolution signal HEg is subjected to decoding similar to that for the coded low-resolution signal LEg. This decoding processfor the coded high-resolution signal HEg is identical to that for the coded low-resolution signal LEg except the process of generating data of a prediction block for a target block.

To be specific, the process of generating data of a prediction block employs the padded data (space prediction signal) LPRg of the reproduced low-resolution block from the first padding unit 626, in addition to the time prediction signal (data of a high-resolution prediction block) HPg obtained by motion compensation in the second motion compensator 608. The data LPRg of the reproduced low-resolution block is interpolated by up-sampling in the converter 637 to be output as resolution-converted data TPRg.

The resolution-converted data TPRg obtained by up-sampling the space prediction signal LPRg is input to the weighted averaging unit 618 together with the time prediction signal HPg. In the weighted averaging unit 618, the time prediction signal HPg and the resolution-converted data TPRg are subjected to weighted averaging to be converted to weighted average prediction data APg, and this data APg is output to the first adder 604 in the high-resolution decoding unit 660b.

The weight ratio may be determined in advance at the transmission or receiving end. Or, weight information may be transmitted to the receiving end together with the coded high-resolution signal HEg, and extracted by the second data analyzer 602 in the high-resolution decoding unit 660a to be supplied to the weighted averaging unit 618.

As described above, in this sixth embodiment, since padding is performed on only the ineffective blocks comprising insignificant samples amongst the reproduced low-resolution blocks, even when the space prediction block in the low-resolution image space is positioned outside the object, the respective sample values in the space prediction block are replaced with a predetermined sample value or the sample values of the inside-object pixels. Therefore, it is possible to suppress a prediction error signal which is a difference between the data of the high-resolution object block and the data obtained by resolution-converting the data of the space prediction block.

While in this sixth embodiment output data from the first padding unit 626 is used as a space prediction signal, data LMg which is read from the first frame memory 627 to the first motion compensator 628 may be used.

Further, when the coded low-resolution signal and the coded high-resolution signal correspond to image spaces of the same size but there is a time lag between them, i.e., when the coded low-resolution signal and the coded high-resolution signal are output from the texture coding unit of the hierarchical coding apparatus which is described as the modification of the fifth embodiment, the converter 637 performs, instead of interpolation, a process of reading data of a prediction block from the first frame memory 627 by motion compensation based on the motion vector LMV.

The converter (temporal up-sampling unit) so constructed receives the low-resolution side motion vector LMV and performs scaling on the motion vector LMV to generate a motion vector (scaling motion vector) for a target block to be processed in the present frame which is presently processed in the high-resolution decoding unit 660a. Based on the scaling motion vector, data of a prediction block for the target block in the present frame on the high-resolution side is generated from the data stored in the frame memory 627 in the low-resolution decoding unit 660b, and this data is output as resolution-converted data TPRg to the weighted averaging unit 618.

While the data of the prediction block for the high-resolution side target block is generated in the low-resolution decoding unit 660b, in the high-resolution decoding unit 660a the data HPg of the prediction block for the high-resolution side target block is generated by the motion compensator 608 according to the high-resolution side motion vector HMV, and this data is output to the weighted averaging unit 618.

In the weighted averaging unit 618, the data HPg of the prediction block generated in the high-resolution decoding unit 660a and the resolution-converted data TPRg (the data of the prediction block generated in the low-resolution decoding unit 660b) are converted to weighted average prediction data APg by weighted averaging. The weighted average prediction data APg is input to the second adder 604.

Hereinafter, decoding of coded texture signals corresponding to sequential frames F(0), F(1), F(2), F(3), F(4), F(5), and F(6) will be described in detail.

The coded texture signals corresponding to the frames F(0), F(3), and F(6) are input to the low-resolution decoding unit 660b, and the texture signals corresponding to the frames F(1), F(2), F(4), and F(5) are input to the high-resolution decoding unit 660a.

At this time, in the low-resolution decoding unit 660b, for example, data of a prediction block for a target block in the frame F(2) is generated as follows.

Since the coded texture signal corresponding to the frame F(2) is not input to the low-resolution decoding unit 660b, motion vectors of the respective blocks in the frame F(2) are not obtained. Therefore, in the low-resolution decoding unit 660b, the motion vector LMV of a block in the frame F(3) corresponding to the target block in the frame F(2) is subjected to scaling by the temporal up-sampling unit, whereby a scaling motion vector corresponding to the target block in the frame F(2) is generated.

In this case, since the reference frame for the frame F(3) is the frame F(0) and two frames (i.e., frames F(1) and F(2)) are present between the frame F(0) and the frame F(3), the motion vector LMV in the frame F(3) is increased by $2/3$ times in the scaling process, resulting in a scaling motion vector of the target block in the frame F(2).

Further, in the temporal up-sampling unit, data TPRg of a prediction block for the target block in frame F(2) is generated according to the scaling motion vector by using the frame F(0) as a reference frame.

On the other hand, in the high-resolution decoding unit 660a, data HMg of a prediction block is generated by the motion compensator 608, based on the motion vector HMV of the target block in the frame F(2), which is obtained by motion detection at the coding end by using the frame F(1) as a reference frame.

In the weighted averaging unit 618, the prediction block data HPg generated in the high-resolution decoding unit 660a and the resolution-converted data TPRg (the data of the prediction block generated in the low-resolution decoding unit 660b) are subjected to weighted averaging to generate weighted average prediction data APg for the target block in the frame F(2).

In the hierarchical decoding process using a low-resolution texture signal obtained by temporal down-sampling, the following prediction may be performed, instead of the above-described process of generating data of a prediction block for the high-resolution side target block from the low-resolution texture signal by using a motion vector (scaling motion vector) obtained by scaling the low-resolution side motion vector.

That is, in this prediction process, motion compensation is performed based on the motion vector obtained by data analysis of the coded high-resolution texture signal by referring to the low-resolution side reference frame, whereby data of a prediction block for the high-resolution side target block can be obtained.

Hereinafter, a description will be given of the process of generating data of a prediction block for a target block in the present frame F(2) on the high-resolution side from the texture signal of the low-resolution side reference frame F(0).

In this case, the coded high-resolution texture signal includes information relating to the motion vector of the target block in the present frame F(2) corresponding to the reference frame F(1), and information relating to the motion vector (additional motion vector) of the target block in the present frame F(2) corresponding to the reference frame F(0).

In the motion compensator 628 in the low-resolution decoding unit 660b, data of a prediction block for the target block in the present frame F(2) is generated from the reference frame F(0) stored in the frame memory 627, based on the additional motion vector.

Further, in the low-resolution (high-resolution) decoding unit 660b (660a) according to this sixth embodiment, padding for the data of the reproduced low-resolution (high-resolution) block is performed by using the first (second) padding unit. However, the padding for the reproduced block in each coding unit may be performed by using an initialization unit for initializing the frame memory and a switch for controlling supply of the data of the reproduced block from the padding unit to the frame memory, like the fourth embodiment of the invention. In this case, the frame memory is initialized for each frame and, thereafter, only the data of the effective reproduced blocks including at least one significant sample are overwritten in the initialized frame memory.

In the first, third, and fifth embodiments of the invention, emphasis has been placed on an arbitrary shape coding apparatus which receives an image signal corresponding to an arbitrarily shaped image (object) and including a shape signal and a texture signal. This apparatus includes a shape coding unit and a texture coding unit in which padding units for target, residual, and reproduced data decide whether target, residual, and reproduced blocks are effective blocks or ineffective blocks in accordance with a shape signal or a reproduced shape signal from the shape coding unit. However, an arbitrary shape coding apparatus which receives an image signal including a texture signal and a transparency signal is also within the scope of the invention.

In this case, coding of the transparency signal is performed as follows. Shape information, which is included in the transparency signal and comprises binary data indicating whether each pixel is positioned inside the object or outside the object, is coded in the shape coding unit, while transparency information, which is included in the transparency signal and comprises multivalued data indicating the transparency of each pixel inside the object, is coded in the texture coding unit by similar coding process to that for the texture signal.

Further, in the target, residual, and reproduced data padding units in the texture coding unit, decisions as to whether the target, residual, and reproduced blocks are effective blocks or ineffective blocks are performed based on data (values) included in the transparency signal or the reproduced transparency signal, i.e., "0" indicating that the pixel is positioned outside the object and values other than "0" (non-zero values) indicating that the pixel is positioned inside the object.

In the second, fourth, and sixth embodiment of the invention, emphasis has been placed on an arbitrary shape decoding apparatus which receives a coded image signal corresponding to an arbitrarily shaped image (object) and including a coded shape signal and a coded texture signal. This apparatus includes a shape decoding unit and a texture decoding unit in which a reproduced data padding unit decides whether a reproduced block is an effective block or an ineffective block in accordance with a reproduced shape signal from the shape decoding unit. However, an arbitrary shape decoding apparatus which receives a coded image signal including a coded texture signal and a coded transparency signal is also within the scope of the invention.

In this case, decoding of the coded transparency signal is performed as follows. Coded data of shape information, which is included in the coded transparency signal and comprises binary data indicating whether each pixel is positioned inside the object or outside the object, is decoded in the shape decoding unit, while coded data of transparency information, which is included in the coded transparency signal and comprises multivalued data indicating the transparency of each pixel inside the object, is decoded in the texture decoding unit by similar decoding process to that for the coded texture signal.

Further, in the reproduced data padding unit in the texture decoding unit, decision as to whether the reproduced block is an effective block or an ineffective block is performed based on data (values) included in a reproduced transparency signal obtained by decoding the coded transparency signal, i.e., "0" indicating that the pixel is positioned outside the object and values other than "0" (non-zero values) indicating that the pixel is positioned inside the object.

When a coding or decoding program for implementing the arbitrary shape coding apparatus or the arbitrary shape decoding apparatus according to any of the aforementioned embodiments is recorded in a data storage medium such as a floppy disk, the coding or decoding process described above can be easily performed in an independent computer system.

Figure 10:
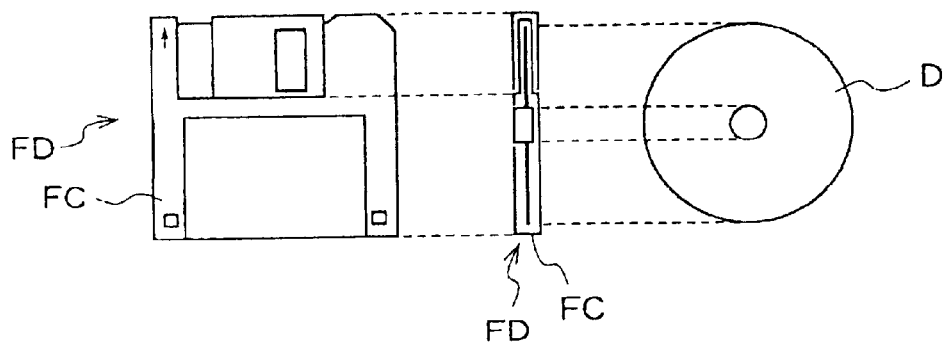
FIGS. 10(a) and 10(b) are diagrams for explaining a data storage medium which contains a program for implementing the coding or decoding process according to any of the aforementioned embodiments by a computer system.
FIG. 10(c) is a diagram illustrating the computer system.
Figure 10:
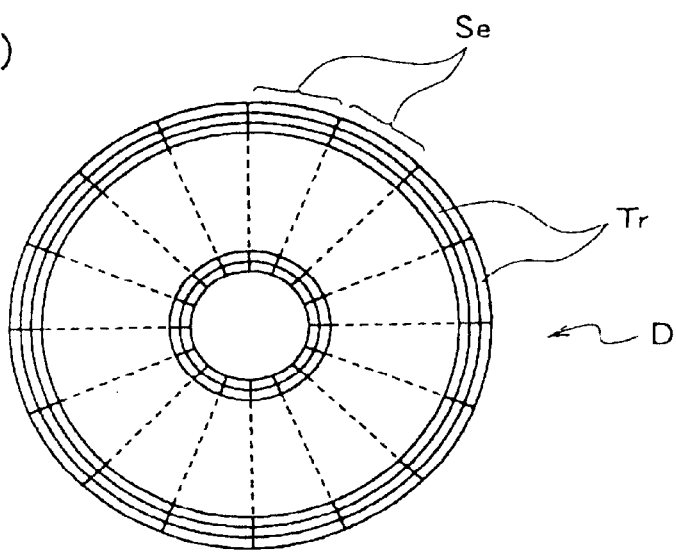
Figure 10:
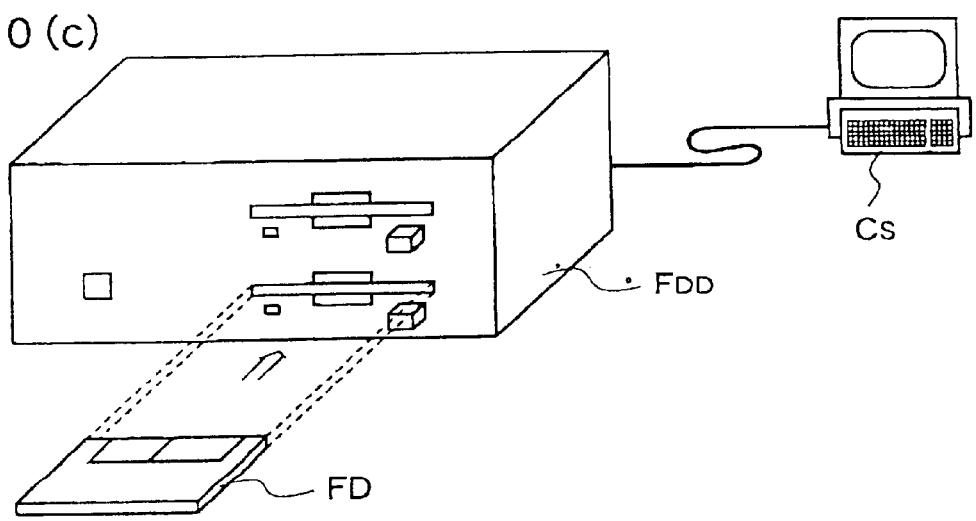

FIGS. 10(a)–10(c) are diagrams for explaining the case where the coding or decoding process according to any of the first to sixth embodiments is executed by a computer system, using a floppy disk which contains the coding or decoding program.

FIG. 10(a) shows a front view of a floppy disk FD, a cross-sectional view thereof, and a floppy disk body D. FIG. 10(b) shows an example of a physical format of the floppy disk body D.

The floppy disk body D is contained in a case FC, providing the floppy disk FD. On the surface of the disk body D, a plurality of tracks Tr are formed concentrically from the outer circumference of the disk toward the inner circumference. Each track is divided into 16 sectors (Se) in the angular direction. Therefore, in the floppy disk FD containing the above-mentioned program, data of the program are recorded in the assigned sectors on the floppy disk body D.

FIG. 10(c) shows the structure for recording the program in the floppy disk FD and performing the image processing by software using the program stored in the floppy disk FD.

To be specific, when the program is recorded in the floppy disk FD, data of the program are written in the floppy disk FD from the computer system Cs through the floppy disk drive FDD. When the above-mentioned arbitrary shape coding apparatus or arbitrary shape decoding apparatus is constructed in the computer system Cs by the program recorded in the floppy disk FD, the program is read from the floppy disk FD by the floppy disk drive FDD and then loaded to the computer system Cs.

Although in the above description a floppy disk is employed as a data storage medium, an optical disk may be employed. Also in this case, the coding process or the decoding process by software can be performed in similar manner to the case of using the floppy disk. The data storage medium is not restricted to the floppy disk and the optical disk, and any medium may be employed as long as it can contain the program, for example, an IC card or a ROM cassette.

What is claimed is:

1. An image processing method for coding an image signal corresponding to each frame forming an image space including an object of an arbitrary shape, for each of plural blocks into which the image space is divided, said method comprising:

outputting difference data between image data of a target block to be coded in a frame which is presently processed and image data of a prediction block for the target block, as image data of a difference block;

compressing the image data of the difference block to generate image data of a compressed difference block and then coding the image data of the compressed difference block to generate a coded image signal, while decompressing the image data of the compressed difference block to restore the difference data as image data of a decompressed difference block;

adding the image data of the decompressed difference block and the image data of the prediction block to generate image-data of a reproduced block;

outputting the image data of the reproduced block after replacing insignificant pixel values constituting the reproduced block with a predetermined padding value when the reproduced block is an ineffective block comprising only insignificant pixels, on the other hand, outputting the image data of the reproduced block as it is when the reproduced block is an effective block, other than the ineffective block, which has at least one significant pixel; and generating image data of a prediction block for a target block in a frame to be processed next in accordance with the image data of the effective block and the image data of the padded ineffective block.

2. A data storage medium containing a program which enables a computer to perform processing of an image signal corresponding to an object having an arbitrary shape, said program being constructed such that it enables the computer to perform an image coding process by said image processing method of claim 1.

3. An image processing method for decoding a coded image signal which is obtained by coding an image signal corresponding to each frame forming an image space including an object of an arbitrary shape, said coding and decoding being performed for each of plural blocks into which the image space is divided, said method comprising:

extracting, based on the coded image signal, as image data of a compressed difference block, compressed data obtained by compressing difference data between image data of a target block to be coded and image data of a prediction block for the target block;

decompressing the image data of the compressed difference block to restore the difference data as image data of a decompressed difference block in a frame which is presently processed;

adding the image data of the decompressed difference block and image data of a prediction block for the decompressed difference block to generate image data of a reproduced block;

outputting the image data of the reproduced block after replacing insignificant pixel values constituting the reproduced block with a predetermined padding value when the reproduced block is an ineffective block comprising only insignificant pixels, on the other hand, outputting the image data of the reproduced block as it is when the reproduced block is an effective block, other than the ineffective block, which has at least one significant pixel; and generating image data of a prediction block for a decompressed difference block in a frame to be processed next, in accordance with the image data of the effective block and the image data of the padded ineffective block.

4. A data storage medium containing a program which enables a computer to perform processing of an image signal corresponding to an object having an arbitrary shape, said program being constructed such that it enables the computer to perform an image decoding process by said image processing method of claim 3.

5. An image processing method for coding an image signal corresponding to each frame forming an image space including an object of an arbitrary shape, for each of plural blocks into which the image space is divided, said method comprising:

outputting difference data between image data of a target block to be coded in a frame which is presently processed and image data of a prediction block for the target block, as image data of a difference block;

compressing the image data of the difference block to generate image data of a compressed difference block and then coding the image data of the compressed difference block to generate a coded image signal, while decompressing the image data of the compressed difference block to restore the difference data as image data of a decompressed difference block;

adding the image data of the decompressed difference block and the image data of the prediction block to generate image data of a reproduced block;

overwriting only image data of blocks other than an ineffective block comprising only insignificant pixels, amongst, plural reproduced blocks into a frame memory which is initialized frame by frame, thereby storing the image data of the effective blocks as reference image data;

and generating image data of a prediction block for a target block in a frame to be processed next in accordance with the reference image data stored in the frame memory.

6. A data storage medium containing a program which enables a computer to perform processing of an image signal corresponding to an object having an arbitrary shape, said program being constructed such that it enables the computer to perform an image coding process by said image processing method of claim 5.

7. An image processing method for decoding a coded image signal which is obtained by coding an image signal corresponding to each frame forming an image space including an object of an arbitrary shape, said coding and decoding being performed for each of plural blocks into which the image space is divided, said method comprising:

generating, based on the coded image signal, as image data of a compressed difference block, compressed data obtained by compressing image data of a difference block which is difference data between image data of a target block to be coded and image data of a prediction block for the target block;

decompressing the image data of the compressed difference block to restore the difference data as image data of a decompressed difference block in a frame which is presently processed;

adding the image data of the decompressed difference block and image data of a prediction block for the decompressed difference block to generate image data of a reproduced block;

overwriting only image data of blocks other than a block comprising only insignificant pixels, amongst plural reproduced blocks, into a frame memory which is initialized frame by frame, thereby storing the image data of the effective blocks as reference image data; and generating image data of a prediction block for a decompressed difference block in a frame to be processed next in accordance with the reference image data stored in the frame memory.

8. A data storage medium containing a program which enables a computer to perform processing of an image signal corresponding to an object having an arbitrary shape, said program being constructed such that it enables the computer to perform an image decoding process by said image processing method of claim 7.

9. An image processing apparatus for coding an image signal corresponding to each frame forming an image space including an object of an arbitrary shape, for each of plural blocks into which the image space is divided, said apparatus comprising subtraction device operable to output difference data between image data of a target block to the coded in a frame which is presently processed and image data of a prediction block for the target block, as image data of a difference block;

a data compressor operable to subject the image data of the difference block to a predetermined data compression process to output image data of a compressed difference block;

a data decompressor operable to subject the image data of the compressed difference block to a predetermined data decompression process to restore the difference data as image data of a decompressed difference block;

addition device operable to add the image data of the decompressed difference block and the image data of the prediction block to generate image data of a reproduced block;

padding device operable to output the image data of the reproduced block after replacing insignificant pixel values constituting the reproduced block with a predetermined padding value when the reproduced block is an ineffective block comprising only insignificant pixels, and output the image data of the reproduced block as it is when the reproduced block is an effective, other than the ineffective block, which has at least one significant pixel;

a frame memory operable to store, as reference image data, the image data of the effective block and the image data of the padded reproduced block which are output from said padding device; and prediction data generation device operable to generate image data of a prediction block for a target block in a frame to be processed next, from the reference image data stored in said frame memory.

10. The apparatus of claim 9 further comprising:

difference block padding device which is operable to subject the image data of the difference block to a padding process for replacing pixel values of insignificant pixels included in the block with a predetermined padding value, in accordance with a significance signal which is a component of the image signal and includes information as to whether each pixel in the image space is a significant pixel or not, and outputs the image data of the padded difference block to said data compressor.

11. The apparatus of claim 10 wherein said significance signal is a transparency signal which corresponds to each of the pixels constituting the object included in the image space, and indicates the transparency of the image of the object.

12. The apparatus of claim 9 further comprising:

target block padding device which is operable to the image data of the target block to a padding process for replacing pixel values of insignificant pixels included in the target block with a predetermined padding value, in accordance with a significance signal which is a component of the image signal and includes information as to whether each pixel in the image space is a significant pixel or not, and outputs the image data of the padded target block to said subtraction device.

13. The apparatus of claim 12 wherein said significance signal is a transparency signal which corresponds to each of the pixels constituting the object included in the image space, and indicates the transparency of the image of the object.

14. The apparatus of claim 9 wherein:

said padding device is constructed so as to be operable to perform a padding process for replacing pixel values constituting the image data of the reproduced block with the predetermined padding value, in accordance with a significance signal which is included in the image signal and indicates whether each of the pixels constituting the reproduced block is a significant pixel positioned inside the object or an insignificant pixel positioned outside the object; and said significance signal is a transparency signal which corresponds to each of the pixels constituting the object included in the image space and indicates the transparency of the image of the object.

15. An image processing apparatus for decoding a coded image signal obtained by coding an image signal corresponding to each frame forming an image space including an object of an arbitrary shape, the coding and decoding being performed for each of plural blocks into which the image space is divided, said apparatus comprising:

a data analyzer operable to perform data analysis on the coded image signal to generate, as image data of a compressed difference block, compressed data obtained by compressing difference data between image data of a target block to be coded and image data of a prediction block for the target block;

a data decompressor operable to decompress the image data of the compressed difference block to restore the difference data as image data of a decompressed difference block in a frame which is presently processed;

addition device operable to add the image data of the decompressed difference block and the image data of the prediction block to generate image data of a reproduced block;

padding device operable to output the image data of the reproduced block after replacing insignificant pixel values constituting the reproduced block with a predetermined padding value when the reproduced block is an ineffective block comprising only insignificant pixels, and outputting the image data of the reproduced block as it is when the reproduced block is an effective block, other than the ineffective block, which has at least one significant pixel;

a frame memory operable to store the image data of the effective block and the image data of the padded reproduced block, as reference image data; and prediction data generation device operable to generate image data of a prediction block for a decompressed difference block in a frame to be processed next, from the reference image data stored in the frame memory.

16. The apparatus of claim 15 wherein:

said padding device is constructed so as to be operable to perform a padding process for replacing pixel values constituting the image data of the reproduced block with the predetermined padding value, in accordance with significant pixel information which is included in the coded image signal and indicates whether each of the pixels constituting the reproduced block is a significant pixel positioned inside the object or an insignificant pixel positioned outside the object; and said significant pixel information is included in a coded transparency signal obtained by coding a transparency signal which corresponds to each of the pixels constituting the object included in the image space and indicates the transparency of the image of the object.

17. An image processing apparatus for coding an image signal corresponding to each frame forming an image space including an object of an arbitrary shape, for each of plural blocks into which the image space is divided, said apparatus comprising:

subtraction device operable to output difference data between image data of a target block to be coded in a frame which is presently processed and image data of a prediction block for the target block, as image data of a difference block;

a data compressor operable to subject the image data of the difference block to data compression to output image data of a compressed difference block;

a data decompressor operable to subject the image data of the compressed difference block to data decompression to restore the difference data as image data of a decompressed difference block;

addition device operable to add the image data of the decompressed difference block and the image data of the prediction block to generate image data of a reproduced block;

a frame memory operable to store the image data of the reproduced block as reference image data;

initialization device operable to initialize said frame memory frame by frame;

data supply control device means disposed between said addition device and said frame memory, operable to control a supply of the image data of the reproduced block from said addition device to said frame memory; and prediction data generation device operable to generate image data of a prediction block for a target block in a frame to be processed next, from the reference image data stored in said frame memory;

wherein said data supply control device is operable to output the image data of the reproduced block so that the image data is overwritten in said initialized frame memory, only when the reproduced block is a block other than an ineffective block comprising only insignificant pixels, in accordance with significant pixel information which is included in the image signal and indicates whether each of the pixels constituting the reproduced block is a significant pixel positioned inside the object or an insignificant pixel positioned outside the object.

18. An image processing apparatus for decoding a coded image signal obtained by coding an image signal corresponding to each frame forming an image space including an object of an arbitrary shape, the coding and decoding being performed for each of plural blocks into which the image space is divided, said apparatus comprising:

a data analyzer operable to perform data analysis on the coded image signal to generate, as image data of a compressed difference block, compressed data obtained by compressing difference data between image data of a target block to be coded and image data of a prediction block for the target block;

a data decompressor operable to decompress the image data of the compressed difference block to restore the difference data as image data of a decompressed difference block in a frame which is presently processed;

addition device operable to add the image data of the decompressed difference block and the image data of the prediction block to generate image data of a reproduced block;

a frame memory operable to store the image data of the reproduced block as reference image data;

initialization device operable to initialize said frame memory frame by frame;

data supply control device disposed between said addition device and said frame memory, operable to control supply of the image data of the reproduced block from the addition means to the frame memory; and prediction data generation device operable to generate image data of a prediction block for a decompressed difference block in a frame to be processed next, from the reference image data stored in the frame memory;

wherein said data supply control device is operable to output the image data of the reproduced block so that the image data is overwritten in said initialized frame memory, only when the reproduced block is a block other than an ineffective block comprising only insignificant pixels, in accordance with significant pixel information which is included in the coded image signal and indicates whether each of the pixels constituting the reproduced block is a significant pixel positioned inside the object or an insignificant pixel positioned outside the object.

* * * * *

UNITED STATES PATENT AND TRADEMARK OFFICE
CERTIFICATE OF CORRECTION

PATENT NO. : 6,233,279 B1
DATED : May 15, 2001
INVENTOR(S) : Choong Seng Boon

It is certified that error appears in the above-identified patent and that said Letters Patent is hereby corrected as shown below:

Title page,
Item [75], change "Moriguchi" to -- Moriguchi-shi --.
Item [30], change "10-147835" to -- Hei 10-147835 --.

Column 3,
Line 24, change "was" to -- when --.

Column 5,
Line 12, change "generated" to -- generate --.

Column 6,
Line 9, change "generated" to -- generate --.

Column 7,
Line 18, change "the" to -- a --.
Line 19, change "a" to -- the --.
Line 43, change "the" to -- a --.

Column 10,
Line 35, change "fame" to -- frame --.
Line 36, insert -- to -- after "operable".

Column 11,
Line 38, change "comprise" to -- comprises --.

Column 12,
Line 42, change "inefficient" to -- ineffected --.

Column 13,
Line 3, change "operable to" to -- for --.
Line 4, change "compressor" to -- decompressor --.
Line 4, change "for" to -- operable to --.

Column 23,
Line 62, change "300" to -- 330 --.

Column 24,
Line 25, change ""127"" to -- "128" --.

UNITED STATES PATENT AND TRADEMARK OFFICE
CERTIFICATE OF CORRECTION

PATENT NO. : 6,233,279 B1
DATED : May 15, 2001
INVENTOR(S) : Choong Seng Boon

It is certified that error appears in the above-identified patent and that said Letters Patent is hereby corrected as shown below:

Column 25,
Line 8, change "reproduction" to -- reproduced --.
Line 19, change "206$b$" to -- 200$b$ --.

Column 26,
Line 62, "550$f$" to -- 500$f$ --.

Column 27,
Line 34, change "un-sampling" to -- up-sampling --.
Line 64, change "perform" to -- performs --.

Column 30,
Line 49, change "Sq" to -- Sg --.

Column 31,
Line 15, change "of" to -- or --.

Column 32,
Line 31, change "T + H · Tf" to -- t + N · Tf --.
Line 38, change "the" to -- The --.
Line 58, insert -- F (0), F(N), F(2N), . . ., and the texture signals corresponding to the frames -- after "frames" (first occurrence).
Line 65, change "T + N · Tf, T +2N · Tf" to -- t + N · Tf, t + 2N · Tf --.

Column 33,
Lines 14 and 17, change "high resolution" to -- high-resolution --.
Line 22, insert -- 550a and the resolution-converted data TPRg (the data of the prediction block generated in the low-resolution coding unit -- after "unit".
Line 53, insert -- frames F(1) and F(2)) are present between the frame F(0) and the -- after "i.e.".
Line 53, change "frames" to -- frame --.

Column 34,
Line 9, change "temporarl" to -- temporal --.
Line 65, insert -- the entire structure of the apparatus while figure 9 shows -- after "shows".

Column 35,
Line 2, change "received" to -- receives --.
Line 25, insert -- to generate the reproduced high-resolution signal HEg, -- after "HEg".
Line 37, change "LRg" to -- LPg --.

UNITED STATES PATENT AND TRADEMARK OFFICE
CERTIFICATE OF CORRECTION

PATENT NO. : 6,233,279 B1
DATED : May 15, 2001
INVENTOR(S) : Choong Seng Boon

It is certified that error appears in the above-identified patent and that said Letters Patent is hereby corrected as shown below:

Column 36,
Line 6, insert -- 60. The second prediction signal generation unit -- after "unit".
Line 31, insert -- high-resolution and low-resolution shape signals HEk and LEk of each block by a method of quad-tree, in place of the -- after "coded".
Line 49, change "LQG" to -- LQg --.
Line 67, insert -- In the first adder 624, the data LPg of the low-resolution prediction block and the data LITg of the decompressed residual block are added, whereby data LRg of a reproduced low-resolution block is generated. -- after "627.".

Column 37,
Line 27, change "significant" to -- insignificant --.
Line 34, change "processfor" to -- process for --.

Column 43,
Line 17, delete "," after "amongst".
Line 17, insert -- , -- after "blocks".
Line 20, insert -- and -- after ";".
Line 21, delete "and".

Column 44,
Line 3, insert -- : -- after "comprising".
Line 5, change "the" to -- be --.
Line 27, insert -- block -- after "effective".
Line 54, insert -- subject -- after "to".

Signed and Sealed this

Tenth Day of September, 2002

Attest:

Attesting Officer

JAMES E. ROGAN
Director of the United States Patent and Trademark Office